(12) United States Patent
Opshaug et al.

(10) Patent No.: US 11,765,681 B2
(45) Date of Patent: *Sep. 19, 2023

(54) NAVIGATION AND POSITIONING SYSTEM USING RADIO BEAM

(71) Applicant: QUALCOMM Incorporated, San Diego, CA (US)

(72) Inventors: Guttorm Ringstad Opshaug, Redwood City, CA (US); Naga Bhushan, San Diego, CA (US); Jie Wu, San Diego, CA (US); Sven Fischer, Nuremberg (DE); Stephen William Edge, Escondido, CA (US); Rayman Wai Pon, Cupertino, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/823,762

(22) Filed: Aug. 31, 2022

(65) Prior Publication Data

US 2022/0417890 A1 Dec. 29, 2022

Related U.S. Application Data

(63) Continuation of application No. 17/302,508, filed on May 5, 2021, now Pat. No. 11,483,795, which is a
(Continued)

(51) Int. Cl.
*H04W 16/28* (2009.01)
*H04W 64/00* (2009.01)
(Continued)

(52) U.S. Cl.
CPC ........... *H04W 64/003* (2013.01); *G01S 1/042* (2013.01); *G01S 5/0215* (2013.01); *H04B 7/0617* (2013.01); *H04W 16/28* (2013.01)

(58) Field of Classification Search
CPC ... H04W 64/003; H04W 16/28; H04W 64/00; H04W 4/02; H04W 64/006;
(Continued)

(56) References Cited

U.S. PATENT DOCUMENTS

| | | | | |
|---|---|---|---|---|
| 7,941,163 | B2* | 5/2011 | Margrave | H04W 64/00 455/67.11 |
| 9,113,350 | B2* | 8/2015 | Militano | H04W 24/02 |

(Continued)

FOREIGN PATENT DOCUMENTS

| | | |
|---|---|---|
| CN | 103546963 A | 1/2014 |
| CN | 104168646 A | 11/2014 |

(Continued)

OTHER PUBLICATIONS

International Preliminary Report on Patentability—PCT/US2019/026741, The International Bureau of WIPO—Geneva, Switzerland, dated Oct. 22, 2020.
(Continued)

*Primary Examiner* — Julio R Perez
(74) *Attorney, Agent, or Firm* — Weaver Austin Villeneuve & Sampson LLP

(57) ABSTRACT

Methods and systems for wireless communication are provided. In one example, a method comprises: receiving, by a mobile device, a radio beam, the radio beam being a directional beam that propagates along an angle of departure with respect to an antenna that transmits the radio beam; identifying, by the mobile device, at least one of: the radio beam or a base station that operates the antenna; determining, by the mobile device, a position of the mobile device based on identifying at least one of the radio beam or the antenna of the base station; and outputting, by the mobile device, the position of the mobile device.

20 Claims, 15 Drawing Sheets

Related U.S. Application Data continuation of application No. 16/378,824, filed on Apr. 9, 2019, now Pat. No. 11,032,792.

(60) Provisional application No. 62/656,159, filed on Apr. 11, 2018.

(51) Int. Cl.
*G01S 1/04* (2006.01)
*H04B 7/06* (2006.01)
*G01S 5/02* (2010.01)

(58) Field of Classification Search
CPC .. H04W 56/0065; G01S 1/042; G01S 5/0215; G01S 5/0218; G01S 5/12; G01S 5/08; G01S 5/10; H04B 7/0617; H04B 7/0695
See application file for complete search history.

(56) References Cited

U.S. PATENT DOCUMENTS

| | | | |
|---|---|---|---|
| 9,954,590 B2* | 4/2018 | Yu | H04B 7/061 |
| 10,247,808 B2 | 4/2019 | Sanderovich et al. | |
| 10,819,405 B2* | 10/2020 | Cai | H04B 7/0617 |
| 11,032,792 B2* | 6/2021 | Opshaug | H04W 64/00 |
| 11,564,199 B2* | 1/2023 | Kumar | H04W 4/024 |
| 2008/0248813 A1 | 10/2008 | Chatterjee | |
| 2013/0113993 A1 | 5/2013 | Dagit, III | |
| 2014/0162704 A1* | 6/2014 | Choi | H04W 64/00 455/456.6 |
| 2014/0162784 A1 | 6/2014 | Hartwell | |
| 2015/0045048 A1* | 2/2015 | Xu | H04W 4/023 455/552.1 |
| 2015/0133173 A1* | 5/2015 | Edge | G01S 5/08 455/456.6 |
| 2015/0188678 A1 | 7/2015 | Wu et al. | |
| 2015/0350839 A1* | 12/2015 | Syrjarinne | G01S 1/02 455/404.2 |
| 2016/0173183 A1* | 6/2016 | Kang | H04B 7/0691 455/562.1 |
| 2016/0212738 A1* | 7/2016 | Thurfjell | H04W 64/00 |
| 2016/0366548 A1* | 12/2016 | Wang | H04W 24/10 |
| 2017/0104517 A1* | 4/2017 | Kakishima | H04B 7/0617 |
| 2017/0212204 A1* | 7/2017 | Amizur | H04B 7/06 |
| 2017/0366244 A1 | 12/2017 | Lee et al. | |
| 2018/0152852 A1* | 5/2018 | Chang | H01Q 3/2605 |
| 2019/0104384 A1* | 4/2019 | Abou-Rizk | H04W 4/30 |
| 2019/0166453 A1* | 5/2019 | Edge | G01S 5/06 |
| 2019/0181920 A1* | 6/2019 | Rofougaran | H04B 7/0617 |
| 2019/0200339 A1* | 6/2019 | Handte | H04B 7/0617 |
| 2019/0253900 A1* | 8/2019 | Narasimha | H04W 4/025 |
| 2019/0297454 A1* | 9/2019 | Smith | G01S 13/878 |
| 2019/0320403 A1* | 10/2019 | Zhang | H04W 64/003 |
| 2019/0320408 A1* | 10/2019 | Opshaug | H04W 64/00 |
| 2019/0372640 A1* | 12/2019 | Sadiq | H04B 7/063 |
| 2019/0373595 A1* | 12/2019 | Sadiq | H04W 64/00 |
| 2019/0379439 A1* | 12/2019 | Bolin | H04B 7/0617 |
| 2020/0088869 A1* | 3/2020 | Pefkianakis | H04W 64/006 |
| 2021/0258915 A1 | 8/2021 | Opshaug et al. | |

FOREIGN PATENT DOCUMENTS

| | | |
|---|---|---|
| CN | 107431894 A | 12/2017 |
| EP | 2381726 A1 | 10/2011 |
| WO | 2015130712 A1 | 9/2015 |
| WO | WO-2016115087 A1 | 7/2016 |
| WO | WO-2017164925 A1 | 9/2017 |
| WO | WO-2018046271 A1 | 3/2018 |

OTHER PUBLICATIONS

International Search Report and Written Opinion—PCT/US2019/026741—ISA/EPO—dated Aug. 26, 2019.
Partial International Search Report—PCT/US2019/026741—ISA/EPO—dated Jun. 28, 2019.

* cited by examiner

NAVIGATION AND POSITIONING SYSTEM USING RADIO BEAM

RELATED APPLICATIONS

This application a continuation of U.S. application Ser. No. 17/302,508, filed May 5, 2021, entitled "Navigation and Positioning System Using Radio Beam," which is a continuation of U.S. application Ser. No. 16/378,824, filed Apr. 9, 2019, entitled "Navigation and Positioning System Using Radio Beam," which claims the benefit of U.S. Provisional Application No. 62/656,159, filed Apr. 11, 2018, entitled "Navigation and Positioning System Using Radio Beam." All of these applications are assigned to the assignee hereof and incorporated herein by reference in their entirety.

BACKGROUND

1. Field

The subject matter disclosed herein relates to electronic devices, and more particularly to methods and apparatuses for use to support location determination of a mobile device using a fifth-generation (5G) wireless network.

2. Information

Obtaining the location or position of a mobile device that is accessing a wireless network may be useful for many applications including, for example, emergency calls, personal navigation, asset tracking, locating a friend or family member, etc. Existing position methods include methods based on measuring the timing of radio signals received from a variety of devices including, for example, satellite vehicles (SVs), terrestrial radio sources (e.g., a base station), etc., in a multiple-access wireless network. Examples of such multiple-access networks include Code Division Multiple Access (CDMA) networks, Time Division Multiple Access (TDMA) networks, Frequency Division Multiple Access (FDMA) networks, etc. A FDMA network may include, for example, Orthogonal FDMA (OFDMA) networks, Single-Carrier FDMA (SC-FDMA) networks, etc.

In an FDMA system, to perform a position measurement, a base station may be scheduled to transmit position measurement signals at certain time periods using frequency resources (e.g., a pre-determined carrier frequency or a set of subcarrier frequencies to perform the transmission). The position measurement signals are typically transmitted using frequency resources different from the frequency resources used for regular data transmission and reception. For example, at the scheduled time periods, a mobile device can suspend the regular data transmission and reception on a first carrier frequency, tune to a second carrier frequency to receive position measurement signals to perform position measurement, and then tune back to the first carrier frequency to resume the regular data transmission and reception on the first carrier frequency.

It is expected that standardization for new fifth-generation (5G) wireless networks will include support for various positioning methods both new and existing, but issues may arise with the current method of transmission of position measurement signals. For example, as described above, to perform position measurement, a mobile device may be required to suspend regular data transmission and reception operations, which can degrade the data throughput of the mobile device. Embodiments disclosed herein address these issues by implementing techniques that minimizes disruption to the regular data transmission and reception operations for position measurements in 5G wireless networks.

SUMMARY

The present disclosure provides a method for wireless communication. The method comprises: receiving, by a mobile device, a radio beam, the radio beam being a directional beam that propagates along an angle of departure with respect to an antenna that transmits the radio beam; identifying, by the mobile device, at least one of: the radio beam or a base station that operates the antenna; determining, by the mobile device, a position of the mobile device based on identifying at least one of the radio beam or the antenna of the base station; and outputting, by the mobile device, the position of the mobile device.

In some aspects, the method further comprises: receiving, by the mobile device, information related to an angle of departure of the radio beam based on identifying the radio beam; determining, by the mobile device and from the information, a location of the identified antenna; and determining, by the mobile device, the position of the mobile device based on the angle of departure of the identified radio beam and location of the identified base station.

In some aspects, the information related to the angle of departure of the radio beam includes first mapping information that associates the radio beam with the angle of departure and second mapping information that associates the radio beam with the location of the antenna.

In some aspects, the radio beam is a first radio beam; the angle of departure is a first angle of departure; the location of the antenna is a first location of a first antenna; and the information is first information. The method further comprises: receiving, by the mobile device, a second radio beam; receiving, by the mobile device, second information related to a second angle of departure of the second radio beam; and determining, by the mobile device from the second information, a second location of a second antenna. The position of the mobile device is determined based on the first angle of departure, the first location, the second angle of departure, and the second location.

In some aspects, the method further comprises determining, by the mobile device, a distance between the mobile device and the antenna. The position of the mobile device is determined based on the angle of departure, the location of the antenna, and the distance.

In some aspects, the method further comprises: receiving, by the mobile device and from a base station that operates the antenna, information about a timing offset to synchronize downlink and uplink subframes at the base station. The determination of the distance between the mobile device and the antenna is based on the timing offset.

In some aspects, the method further comprises: receiving, by the mobile device from the antenna, a time of transmission of a radio frame of a synchronization signal from the antenna via the radio beam; determining, by the mobile device, a time of reception of the radio frame of the synchronization signal at the mobile device; and determining, by the mobile device, a time-of-flight based on the time of transmission and the time of reception. The determination of the distance between the mobile device and the antenna is based on the time-of-flight.

In some aspects, the synchronization signal includes at least one of: a PSS (primary synchronization signal), a SSS (secondary synchronization signal), or a TRS (Tracking Reference Signal).

In some aspects, the method further comprises: sending, by the mobile device to a location data base, a query for location information of one or more mobile devices that also receive the radio beam. The position of the mobile device is determined based on the location information.

In some aspects, the radio beam includes information representing a beam identifier that identifies the radio beam. The radio beam is identified based on the beam identifier.

In some aspects, the radio beam includes information representing a cell identifier that identifies a base station that operates the antenna. The antenna is identified based on the cell identifier.

In some aspects, the method further comprises: determining, by the mobile device, whether the radio beam is a line-of-sight beam targeted at an area in which the mobile device is located; and upon determining that the radio beam is a line-of-sight beam, determining the position of the mobile device based on identifying at least one of the radio beam or the antenna of the base station.

In some aspects, determining whether the radio beam is a line-of-sight beam comprises determining whether the mobile device is scheduled to receive the radio beam at a time of receiving the radio beam.

In some aspects, wherein determining whether the radio beam is a line-of-sight beam comprises determining whether a received power level of the radio beam exceeds a pre-determined threshold.

In some aspects, the radio beam is a first radio beam. The method further comprises: receiving, by the mobile device, a second radio beam; determining, by the mobile device, a first time-of-arrival of the first radio beam; and determining, by the mobile device, a second time-of-arrival of the second radio beam. Determining whether the first radio beam is a line-of-sight beam comprises determining whether the first time-of-arrival is earlier than the second time-of-arrival.

In some aspects, outputting the position of the mobile device comprises at least one of: outputting the position via an output interface of the mobile device, providing the position to an application operating on the mobile device, providing the position to a location database, or providing the position to the base station.

The present disclosure also provides a mobile device. The mobile device comprises a wireless receiver configured to receive a radio beam, the radio beam being a directional beam that propagates along an angle of departure with respect to an antenna that transmits the radio beam. The mobile device further comprises a memory that stores a set of instructions, and a processor configured to execute the set of instructions to: identify at least one of: the radio beam or a base station that operates the antenna; determine a position of the mobile device based on identifying at least one of the radio beam or the antenna of the base station; and output the position of the mobile device.

In some aspects, the processor of the mobile device is configured to execute the set of instructions to: receive information related to an angle of departure of the radio beam based on identifying the radio beam; determine, from the information, a location of the identified antenna; and determine the position of the mobile device based on the angle of departure of the identified radio beam and location of the identified base station.

In some aspects, the information related to the angle of departure of the radio beam includes first mapping information that associates the radio beam with the angle of departure and second mapping information that associates the radio beam with the location of the antenna.

In some aspects, the radio beam is a first radio beam; the angle of departure is a first angle of departure; and the location of the antenna is a first location of a first antenna; and the information is first information. The wireless receiver is configured to receive a second radio beam. The processor is configured to execute the set of instructions to: receive second information related to a second angle of departure of the second radio beam; and determine from the second information, a second location of a second antenna. The position of the mobile device is determined based on the first angle of departure, the first location, the second angle of departure, and the second location.

In some aspects, the processor is configured to execute the set of instructions to determine a distance between the mobile device and the antenna. The position of the mobile device is determined based on the angle of departure, the location of the antenna, and the distance.

In some aspects, the processor is configured to execute the set of instructions to receive, from a base station that operates the antenna, information about a timing offset to synchronize downlink and uplink subframes at the base station. The determination of the distance between the mobile device and the antenna is based on the timing offset.

In some aspects, the processor is configured to execute the set of instructions to: receive, via the wireless receiver and from the antenna, a time of transmission of a radio frame of a synchronization signal from the antenna via the first radio beam; determine a time of reception of a radio frame of the synchronization signal at the mobile device; and determine a time-of-flight based on the time of transmission and the time of reception. The determination of the distance between the mobile device and the antenna is based on the time-of-flight.

In some aspects, the synchronization signal includes at least one of: a PSS (primary synchronization signal), a SSS (secondary synchronization signal), or a TRS (Tracking Reference Signal).

In some aspects, the mobile device further comprises a wireless transmitter. The processor is configured to execute the set of instructions to send, via the wireless transmitter and to a location data base, a query for location information of one or more mobile devices that also receive the radio beam. The position of the mobile device is determined based on the location information.

In some aspects, the radio beam includes information representing a beam identifier that identifies the radio beam. The radio beam is identified based on the beam identifier.

In some aspects, the radio beam includes information representing a cell identifier that identifies a base station that operates the antenna. The antenna is identified based on the cell identifier.

In some aspects, the processor is configured to execute the set of instructions to: determine whether the radio beam is a line-of-sight beam targeted at an area in which the mobile device is located based on at least one of: whether the mobile device is scheduled to receive the radio beam at a time of receiving the radio beam, whether a received power level of the radio beam exceeds a pre-determined threshold, or whether a time-of-arrival of the radio beam is earlier than a second time-of-arrival of a second radio beam.

The present disclosure also provides a non-transitory computer readable medium storing instructions that, when executed by a processor of a mobile device, causes the mobile device to: receive, via a wireless receiver of the mobile device, a radio beam, the radio beam being a directional beam that propagates along an angle of departure with respect to an antenna that transmits the radio beam;

identify at least one of: the radio beam or a base station that operates the antenna; determine a position of the mobile device based on identifying at least one of the radio beam or the antenna of the base station; and output the position of the mobile device.

The present disclosure also provides an apparatus comprising: means for receiving a radio beam, the radio beam being a directional beam that propagates along an angle of departure with respect to an antenna that transmits the radio beam; means for identifying at least one of: the radio beam or a base station that operates the antenna; means for determining a position of the apparatus based on identifying at least one of the radio beam or the antenna of the base station; and means for outputting the position of the apparatus.

BRIEF DESCRIPTION OF DRAWINGS

Non-limiting and non-exhaustive aspects are described with reference to the following figures.

Figure 1:
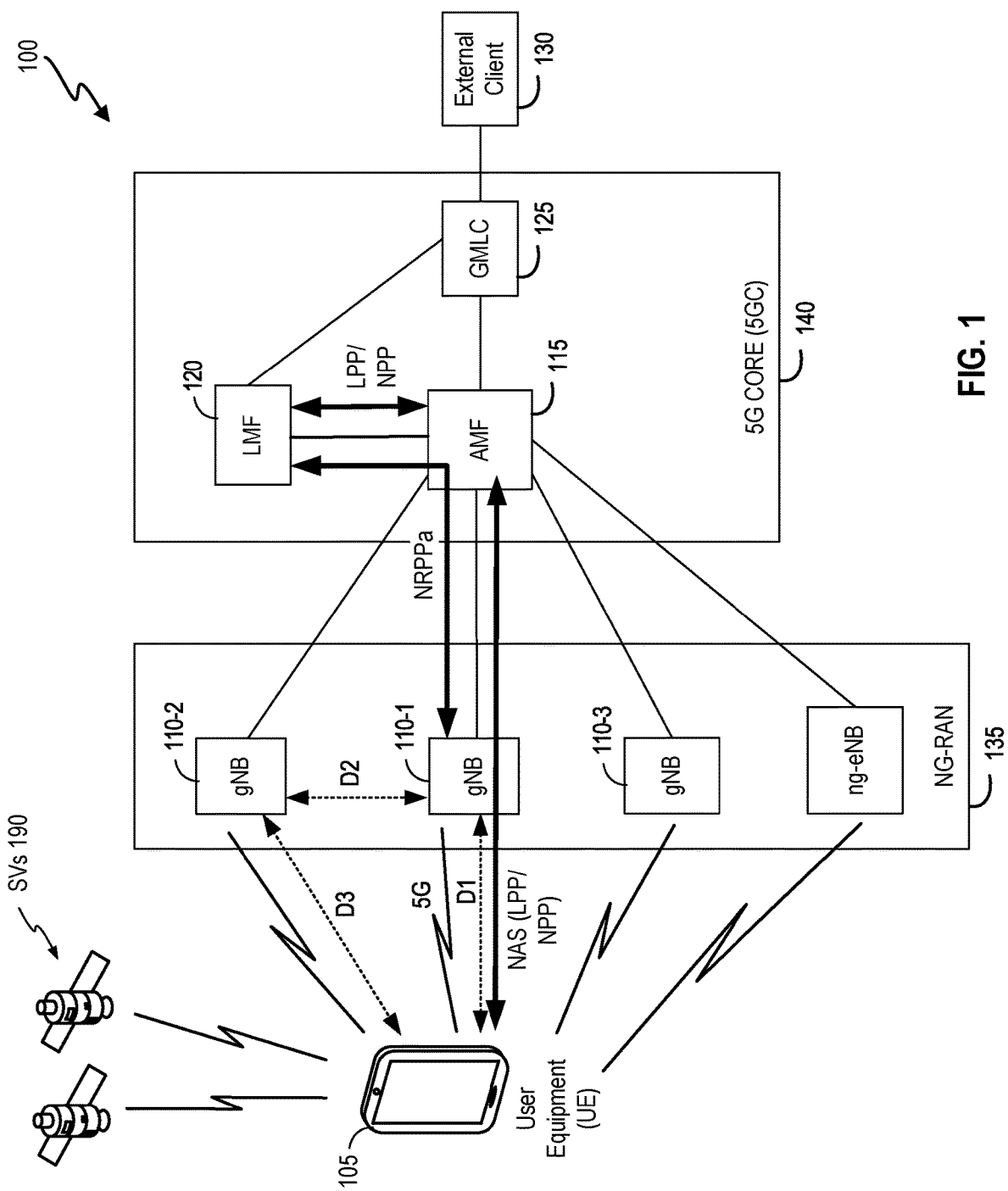
FIG. 1 is a diagram of a communication system that may utilize a 5G network to determine a position of a UE, according to an embodiment.

Like reference numbers and symbols in the various figures indicate like elements, in accordance with certain example implementations. In addition, multiple instances of an element may be indicated by following a first number for the element with a hyphen and a second number. For example, multiple instances of an element 110 may be indicated as 110-1, 110-2, 110-3 etc. When referring to such an element using only the first number, any instance of the element is to be understood (e.g. elements 110 in the previous example would refer to elements 110-1, 110-2 and 110-3).

DETAILED DESCRIPTION

Some example techniques for determining the location of a user equipment (UE) are presented herein, which may be implemented at the UE (e.g., a mobile device or mobile station), a location server (LS), a base station, and/or other devices. These techniques can be utilized in a variety of applications utilizing various technologies and/or standards, including 3rd Generation Partnership Project (3GPP), Open Mobile Alliance (OMA), Long Term Evolution (LTE), Positioning Protocol (LPP) and/or LPP Extensions (LPPe), Wi-Fi®, Global Navigation Satellite System (GNSS), and the like.

A UE may comprise a mobile device such as, for example, a mobile phone, smartphone, tablet or other mobile computer, a portable gaming device, a personal media player, a personal navigation device, a wearable device, an in-vehicle device, or other electronic device. Position determination of a UE can be useful to the UE and/or other entities in a wide variety of scenarios. There are many methods already known to determine an estimated position of the UE, including methods that involve communicating measurement and/or other information between the UE and an LS.

It is expected that fifth-generation (5G) standardization will include support for positioning method. One example of positioning method that may be supported in a 5G network is Observed Time Difference Of Arrival (OTDOA), which is used in LTE network. With OTDOA, a UE measures time differences, referred to as Reference Signal Time Differences (RSTDs), between reference signals transmitted by one or more pairs of base stations. In LTE, the reference signals used for OTDOA may include signals that are intended only for navigation and positioning which may be referred to as Positioning Reference Signals (PRS). To perform a position measurement, a base station may be scheduled to transmit PRS signals at certain time periods using frequency resources (e.g., a pre-determined carrier frequency or a set of subcarrier frequencies to perform the transmission). The PRS signals are typically transmitted using frequency resources different from the frequency resources used for regular data transmission and reception. For example, at the scheduled time periods, a mobile device can suspend the regular data transmission and reception on a first carrier frequency, tune to a second carrier frequency to receive the PRS signals to perform position measurement, and then tune back to the first carrier frequency to resume the regular data transmission and reception on the first carrier frequency. With OTDOA, a UE is used to estimate its location by measuring time differences of receiving PRS signals from multiple base stations. However, the suspension of the regular data transmission and reception to perform position measurement can degrade the data throughput of the UE.

Techniques described herein below can address these issues to improve positioning methods in 5G network. Specifically, a base station in a 5G network can transmit signals used for radio frame synchronization and beam tracking, such as Primary Synchronization Sequences (PSS), Secondary Synchronization Sequences (SSS), Physical Broadcast Channel (PBCH) signals, DeModulation Reference Signal (DMRS), Tracking Reference Signals (TRS), Cell State Information Reference Signal (CSI-RS), etc., using multiple narrow radio beams and at different times. Each radio beam may be directional and has one or more angles of departure (AODs) (e.g. an angle of azimuth and a separate angle of elevation). As to be discussed below, each radio beam may have a relatively narrow beam width and may be targeted at a relatively small geographical area. A mobile device can, as part of the regular data transmission and reception, receive a radio beam that carries the radio frame synchronization and/or tracking signals (e.g., PSS, SSS, PBCH, TRS, etc.). The mobile device may identify the antenna that transmits the radio beam and can determine the location of the identified antenna and the AoDs of the radio beam based on identifying the antenna.

Based on the location of the antenna and the AoDs of the radio beam, the mobile device can estimate its location using various methods. In one example, based on the mobile device receiving multiple radio beams associated with multiple AoDs from multiple antennae (e.g., of multiple cells), the mobile device can determine its position by estimating a location where these beams cross based on the AoDs and the locations of the antennae. This is often referred to as triangulation. In another example, the mobile device can estimate a distance between an antenna and the mobile device. Based on an AoDs of an radio beam transmitted by that antenna, the estimated distance, as well as the location of the antenna, the mobile device can also determine its position. In yet another example, the mobile device can also receive position information from other mobile devices that are in the same geographical area as the mobile device and receive the same radio beam as the mobile device, and use the received position information to estimate its position.

With such arrangements, the disruption to the regular data transmission and/or reception at a mobile device for a position measurement can be reduced, which can improve the data throughput of the mobile device. Due to reduced disruption to the regular data transmission and/or reception, an always-on positioning service can also be provided to, for example, augment the position information provided by other sources (e.g., global positioning service (GPS), Wi-Fi, etc.), to provide an alternative source of position information of the mobile device when those other sources are available, etc. All these can improve the accuracy of position measurement of the mobile device and user experience.

FIG. 1 is a diagram of a communication system 100 that may utilize a 5G network to determine a position of a UE 105 using OTDOA-based positioning methods, according to an embodiment. Here, the communication system 100 comprises a UE 105 and a 5G network comprising a Next Generation (NG) Radio Access Network (RAN) (NG-RAN) 135 and a 5G Core Network (5GC) 140, which, along with providing OTDOA-based positioning, may provide data and voice communication to the UE 105. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in 3GPP. Accordingly, NG-RAN 135 and 5GC 140 may conform to current or future standards for 5G support from 3GPP. The communication system 100 may further utilize information from GNSS satellite vehicles (SVs) 190. Additional components of the communication system 100 are described below. It will be understood that a communication system 100 may include additional or alternative components.

It should be noted that FIG. 1 provides only a generalized illustration of various components, any or all of which may be utilized as appropriate, and each of which may be duplicated as necessary. Specifically, although only one UE 105 is illustrated, it will be understood that many UEs (e.g., hundreds, thousands, millions, etc.) may utilize the communication system 100. Similarly, the communication system 100 may include a larger (or smaller) number of SVs 190, gNBs 110, ng-eNBs 114, AMFs 115, external clients 130, and/or other components. The illustrated connections that connect the various components in the communication system 100 comprise data and signaling connections which may include additional (intermediary) components, direct or indirect physical and/or wireless connections, and/or additional networks. Furthermore, components may be rearranged, combined, separated, substituted, and/or omitted, depending on desired functionality.

The UE 105 may comprise and/or be referred to as a device, a mobile device, a wireless device, a mobile terminal, a terminal, a mobile station (MS), a Secure User Plane Location (SUPL) Enabled Terminal (SET), or by some other name. Moreover, as noted above, UE 105 may correspond to any of a variety of devices, including a cellphone, smartphone, laptop, tablet, PDA, tracking device, navigation device, Internet of Things (IoT) device, or some other portable or moveable device. Typically, though not necessarily, the UE 105 may support wireless communication using one or more Radio Access Technologies (RATs), such as using Global System for Mobile Communications (GSM), Code Division Multiple Access (CDMA), Wideband CDMA (WCDMA), Long Term Evolution (LTE), High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and 5GC 140), etc. The UE 105 may also support wireless communication using a Wireless Local Area Network (WLAN) which may connect to other networks (e.g. the Internet) using a Digital Subscriber Line (DSL) or packet cable for example. The use of one or more of these RATs may enable the UE 105 to communicate with an external client 130 (e.g., via elements of 5GC 140 not shown in FIG. 1 or possibly via Gateway Mobile Location Center (GMLC) 125) and/or enable the external client 130 to receive location information regarding the UE 105 (e.g. via GMLC 125).

The UE 105 may comprise a single entity or may comprise multiple entities such as in a personal area network where a user may employ audio, video and/or data I/O devices and/or body sensors and a separate wireline or wireless modem. An estimate of a location of the UE 105 may be referred to as a location, location estimate, location fix, fix, position, position estimate or position fix, and may be geographic, thus providing location coordinates for the UE 105 (e.g., latitude and longitude) which may or may not include an altitude component (e.g., height above sea level, height above or depth below ground level, floor level or basement level). Alternatively, a location of the UE 105 may be expressed as a civic location (e.g., as a postal address or the designation of some point or small area in a building such as a particular room or floor). A location of the UE 105 may also be expressed as an area or volume (defined either geographically or in civic form) within which the UE 105 is expected to be located with some probability or confidence level (e.g., 67%, 95%, etc.). A location of the UE 105 may further be a relative location comprising, for example, a distance and direction or relative X, Y (and Z) coordinates defined relative to some origin at a known location which may be defined geographically, in civic terms, or by reference to a point, area, or volume indicated on a map, floor plan or building plan. In the description contained herein, the use of the term location may comprise any of these variants unless indicated otherwise.

Base stations in the NG-RAN 135 may comprise NR Node Bs which are more typically referred to as gNBs. In FIG. 1, three gNBs are shown—gNBs 110-1, 110-2 and 110-3, which are collectively and generically referred to herein as gNBs 110. However, a typical NG RAN 135 could comprise dozens, hundreds or even thousands of gNBs 110. Pairs of gNBs 110 in NG-RAN 135 may be connected to one another (not shown in FIG. 1). Access to the 5G network is provided to UE 105 via wireless communication between the UE 105 and one or more of the gNBs 110, which may provide wireless communications access to the 5GC 140 on behalf of the UE 105 using 5G (also referred as NR). In FIG. 1, the serving gNB for UE 105 is assumed to be gNB 110-1 although other gNBs (e.g. gNB 110-2 and/or gNB 110-3) may act as a serving gNB if UE 105 moves to another location or may act as a secondary gNB to provide additional throughput and bandwidth to UE 105.

Base stations (BSs) in the NG-RAN 135 shown in FIG. 1 may also or instead include a next generation evolved Node B, also referred to as an ng-eNB, 114. Ng-eNB 114 may be connected to one or more gNBs 110 in NG-RAN 135 (not shown in FIG. 1), e.g. directly or indirectly via other gNBs 110 and/or other ng-eNBs. An ng-eNB 114 may provide LTE wireless access and/or evolved LTE (eLTE) wireless access to UE 105. Some gNBs 110 (e.g. gNB 110-2) and/or ng-eNB 114 in FIG. 1 may be configured to function as positioning-only beacons which may transmit signals (e.g. a set of pre-determined position measurement signals) and/or may broadcast assistance data to assist positioning of UE 105, but may not receive signals from UE 105 or from other UEs. It is noted that while only one ng-eNB 114 is shown in FIG. 1, the description below sometimes assumes the presence of multiple ng-eNBs 114.

As noted, while FIG. 1 depicts nodes configured to communicate according to 5G communication protocols, nodes configured to communicate according to other communication protocols, such as, for example, an LPP protocol or IEEE 802.11x protocol, may be used. For example, in an Evolved Packet System (EPS) providing LTE wireless access to UE 105, a RAN may comprise an Evolved Universal Mobile Telecommunications System (UMTS) Terrestrial Radio Access Network (E-UTRAN) which may comprise base stations comprising evolved Node Bs (eNBs) supporting LTE wireless access. A core network for EPS may comprise an Evolved Packet Core (EPC). An EPS may then comprise an E-UTRAN plus EPC, where the E-UTRAN corresponds to NG-RAN 135 and the EPC corresponds to 5GC 140 in FIG. 1. The methods and techniques described herein for support of UE 105 positioning may be applicable to such other networks.

The gNBs 110 and ng-eNB 114 can communicate with an Access and Mobility Management Function (AMF) 115, which, for positioning functionality, communicates with a Location Management Function (LMF) 120. The AMF 115 may support mobility of the UE 105, including cell change and handover and may participate in supporting a signaling connection to the UE 105 and possibly data and voice bearers for the UE 105. The LMF 120 may support positioning of the UE 105 when UE 105 accesses the NG-RAN 135 and may support position methods such as Assisted GNSS (A-GNSS), Observed Time Difference of Arrival (OTDOA), Real Time Kinematics (RTK), Precise Point Positioning (PPP), Differential GNSS (DGNSS), Enhanced Cell ID (ECID), angle of arrival (AOA), angle of departure (AOD), and/or other position methods. The LMF 120 may also process location services requests for the UE 105, e.g., received from the AMF 115 or from the GMLC 125. The LMF 120 may be connected to AMF 115 and/or to GMLC 125. The LMF 120 may be referred to by other names such as a Location Manager (LM), Location Function (LF), commercial LMF (CLMF) or value added LMF (VLMF). In some embodiments, a node/system that implements the LMF 120 may additionally or alternatively implement other types of location-support modules, such as an Enhanced Serving Mobile Location Center (E-SMLC) or a Secure User Plane Location (SUPL) Location Platform (SLP). It is noted that in some embodiments, at least part of the positioning functionality (including derivation of a UE 105's location) may be performed at the UE 105 (e.g., using signal measurements obtained by UE 105 for signals transmitted by wireless nodes such as gNBs 110 and ng-eNB 114, and assistance data provided to the UE 105, e.g., by LMF 120).

The Gateway Mobile Location Center (GMLC) 125 may support a location request for the UE 105 received from an external client 130 and may forward such a location request to the AMF 115 for forwarding by the AMF 115 to the LMF 120 or may forward the location request directly to the LMF 120. A location response from the LMF 120 (e.g. containing a location estimate for the UE 105) may be similarly returned to the GMLC 125 either directly or via the AMF 115 and the GMLC 125 may then return the location response (e.g., containing the location estimate) to the external client 130. The GMLC 125 is shown connected to both the AMF 115 and LMF 120 in FIG. 1, though only one of these connections may be supported by 5GC 140 in some implementations.

As further illustrated in FIG. 1, the LMF 120 may communicate with the gNBs 110 and/or with the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between a gNB 110 and the LMF 120, and/or between an ng-eNB 114 and the LMF 120, via the AMF 115. As further illustrated in FIG. 1, LMF 120 and UE 105 may communicate using an LTE Positioning Protocol (LPP), which may be defined in 3GPP TS 36.355. LMF 120 and UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and serving gNB 110-1 or serving ng-eNB 114 for UE 105. For example, LPP and/or NPP messages may be transferred between the LMF 120 and the AMF 115 using service based operations based on the HyperText Transfer Protocol (HTTP) and may be transferred between the AMF 115 and the UE 105 using a 5G Non-Access Stratum (NAS) protocol. The LPP and/or NPP protocol may be used to support positioning of UE 105 using UE assisted and/or UE based position methods such as A-GNSS, RTK, OTDOA and/or ECID. The NRPPa protocol may be used to support positioning of UE 105 using network based position methods such as ECID (e.g., when used with measurements obtained by a gNB 110 or ng-eNB 114) and/or may be used by LMF 120 to obtain location related information from gNBs 110 and/or ng-eNBs 114, such as parameters defining PRS transmission from gNBs 110 and/or ng-eNB 114.

With a UE assisted position method, UE 105 may obtain location measurements and send the measurements to a location server (e.g. LMF 120) for computation of a location estimate for UE 105. For example, the location measurements may include techniques based on radio beam angle of departure (AoD) to be described below. The location measurements may also include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for gNBs 110, ng-eNB 114 and/or a WLAN access point (AP). The location measurements may also or instead include measurements of GNSS pseudorange, code phase and/or carrier phase for SVs 190.

With a UE based position method, UE 105 may obtain location measurements (e.g., which may be the same as or similar to location measurements for a UE assisted position method) and may compute a location of UE 105 (e.g. with the help of assistance data received from a location server such as LMF 120 or broadcast by gNBs 110, ng-eNB 114 or other base stations or APs). In order to perform the position estimation, the UE 105 may have access to information about the expected coverage area of the detected gNB/ngeNB. Such information may be in form of a list of cell parameters, such as antenna location, radio beam direction, antenna pattern, etc. that are associated with the identity of a cell and/or radio beam. In another example, the coverage area of a cell may be indicated as a bounded geographic area where the cell is expected to be detected. The expected coverage information can be stored in a location server database. UE 105 may also receive a list of reference cell and candidate neighbor cells for which to attempt measurements.

With a UE assisted position method, the UE can perform location measurement (e.g., by detecting a cell that transmits the beam, by identifying the beam, etc.) and then report its measurement to a location server. In some examples, the location server can compute the location of UE 105 based on the location measurement reported by UE 105 and the expected coverage information from the location server database including, for example, antenna locations, radio beam direction, antenna pattern, bounded geographic area, etc. associated with the detected cell and/or the identified radio beam. In some examples, the location server can also compute the location of UE 105 based on location measurements reported by other UEs that identify the same cell and/or the same beam. For example, the location server may determine, based on the expected coverage information, that the UEs including UE 105 are in a particular bounded geographic area, and determine the location of UE 105 based on the particular bounded geographic area.

With a network based position method, one or more base stations (e.g. gNBs 110 and/or ng-eNB 114) or APs may obtain location measurements (e.g., measurements of RSSI, RTT, RSRP, RSRQ, Angle of Arrival (AOA) or Time Of Arrival (TOA)) for signals transmitted by UE 105, and may send the measurements to a location server (e.g., LMF 120) for computation of a location estimate for UE 105.

Information provided by a gNB 110 and/or ng-eNB 114 to the LMF 120 using NRPPa may include timing and configuration information for transmission of position measurement signals from the gNB 110 and/or location coordinates for the gNB 110. The LMF 120 can then provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to perform any of a variety of tasks, depending on desired functionality. For example, the LPP or NPP message could contain an instruction for the UE 105 to obtain measurements for GNSS (or A-GNSS), WLAN, and/or OTDOA (or some other position method). In a case where UE 105 is to perform position measurements based on one or more radio beams transmitted by one or more of gNBs 110-n, the LPP or NPP message may provide the UE 105 with information including, for example, information of the scheduled times when the one or more of gNBs 110-n transmit the radio beams, the angle(s) of departure (AoDs) for each radio beam, identification and location information for each radio beam and the antennae (and/or the associated base stations) that transmit the radio beams, etc. UE 105 can receive the radio beams and perform position measurements using the information provided by the LPP or NPP message and based on the techniques to be described below. The UE 105 may send the measurements (or a location computed from the measurements) back to the LMF 120 in an LPP or NPP message (e.g., inside a 5G NAS message) via the serving gNB 110-1 (or serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, in some embodiments, 5GC 140 may be connected to a WLAN using a Non-3GPP InterWorking Function (N3IWF, not shown in FIG. 1) in the 5GC 150. For example, the WLAN may support IEEE 802.11 WiFi access for UE 105 and may comprise one or more WiFi APs. Here, the N3IWF may connect to the WLAN and to other elements in the 5GC 150 such as AMF 115. In some other embodiments, both the NG-RAN 135 and the 5GC 140 may be replaced by other RANs and other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120 and a GMLC that may be similar to the GMLC 125. In such an EPS, the E-SMLC may use LPPa in place of NRPPa to send and receive location information to and from the eNBs in the E-UTRAN and may use LPP to support positioning of UE 105. In these other embodiments, positioning of a UE 105 may be supported in an analogous manner to that described herein for a 5G network with the difference that functions and procedures described herein for gNBs 110, ng-eNB 114, AMF 115 and LMF 120 may, in some cases, apply instead to other network elements such eNBs, WiFi APs, an MME and an E-SMLC.

Figure 2A:
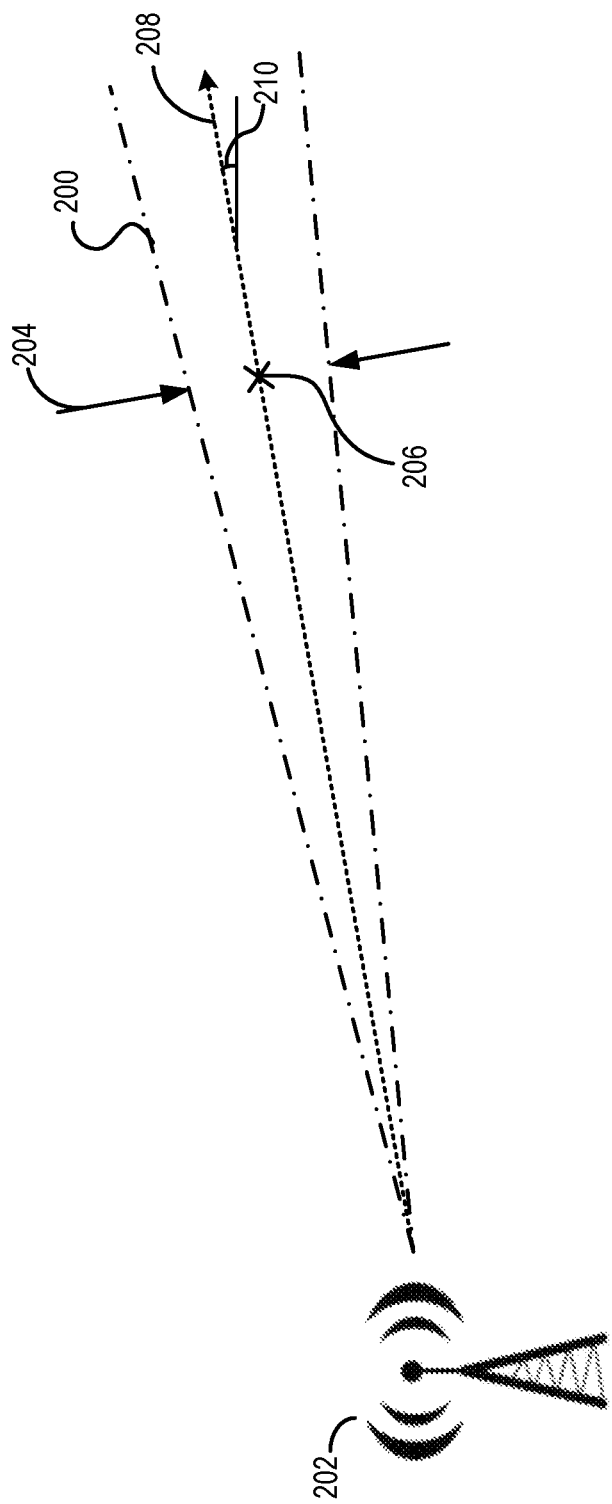
FIGS. 2A-2D represent examples of transmissions of radio beams, according to some embodiments.

FIG. 2A is an example of a radio beam (herein after, "beam") 200 that can be used for position measurement. Beam 200 may be generated by an antenna 202. Beam 200 may be generated by antenna 202 based on an antenna pattern which defines a pattern of radiation of energy (by antenna 202) as a function of space. The pattern of radiation can be defined based on a beam width (e.g., beam width 204) and a corresponding beam center (e.g., beam center 206) along a propagation path (e.g., propagation path 208) of the beam. Propagation path 208 can be associated with an angle of departure (AOD) from antenna 202 and with respect to a reference plane and/or axis. In the example of FIG. 2A, propagation path 208 may be associated with an AOD 210 with respect to an Y-axis (e.g. a horizontal Y-axis). The beam width may define a distance (from a corresponding beam center) where the power level of the beam drops by a pre-determined percentage (e.g., 50% or 3dB) compared with the power level at the corresponding beam center. In some examples, antenna 202 may include a number of antenna elements each of which can transmit radio signals, and antenna 202 can set an angle of departure of a beam by setting phase differences of transmissions by each antenna element. The phase differences can lead to constructive (or destructive) interferences among the transmitted radio signals, to form a beam along a pre-determined propagation path based on the pre-set angle of departure.

Figure 2B:
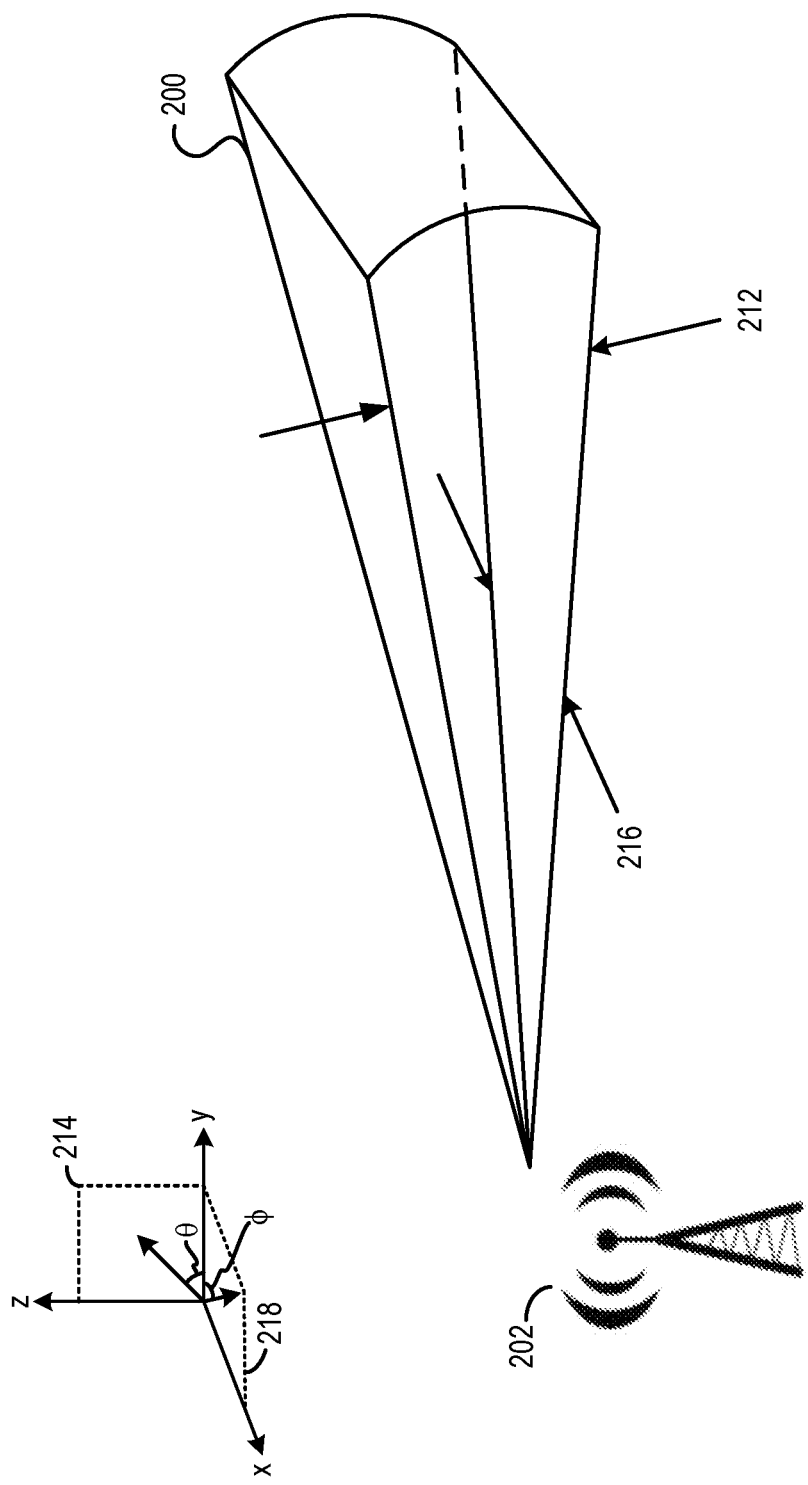

Although FIG. 2A illustrates beam 200 as a two-dimensional beam, it is understood that beam 200 can be a three-dimensional beam, and the antenna pattern that defines beam 200 can be a three-dimensional antenna pattern. FIG. 2B illustrates an example of beam 200 as a three-dimensional beam. In the example of FIG. 2B, beam 200 may be defined by a combination of two two-dimensional antenna patterns. A first two-dimensional antenna pattern, and a first beam width 212, can be defined on an elevation plane 214.

Elevation plane 214 can be defined by the Y-axis and a Z-axis and is perpendicular to a horizontal plane (also referred to as an azimuth plane). A second two-dimensional antenna pattern, and a second beam width 216, can be defined on an azimuth plane 218. Azimuth plane 218 can be defined by the Y-axis and the X-axis and can be perpendicular to elevation plane 214. Beam 200 can also be associated with a first angle of departure (denoted as θ) with azimuth plane 218, which may be referred to as an angle of elevation or as an angle of altitude. Beam 200 can also be associated with a second angle of departure (denoted as φ) on azimuth plane 218 and with reference to, for example, the Y-axis (or the X-axis), which may be referred to as an angle of azimuth.

Figure 2C:
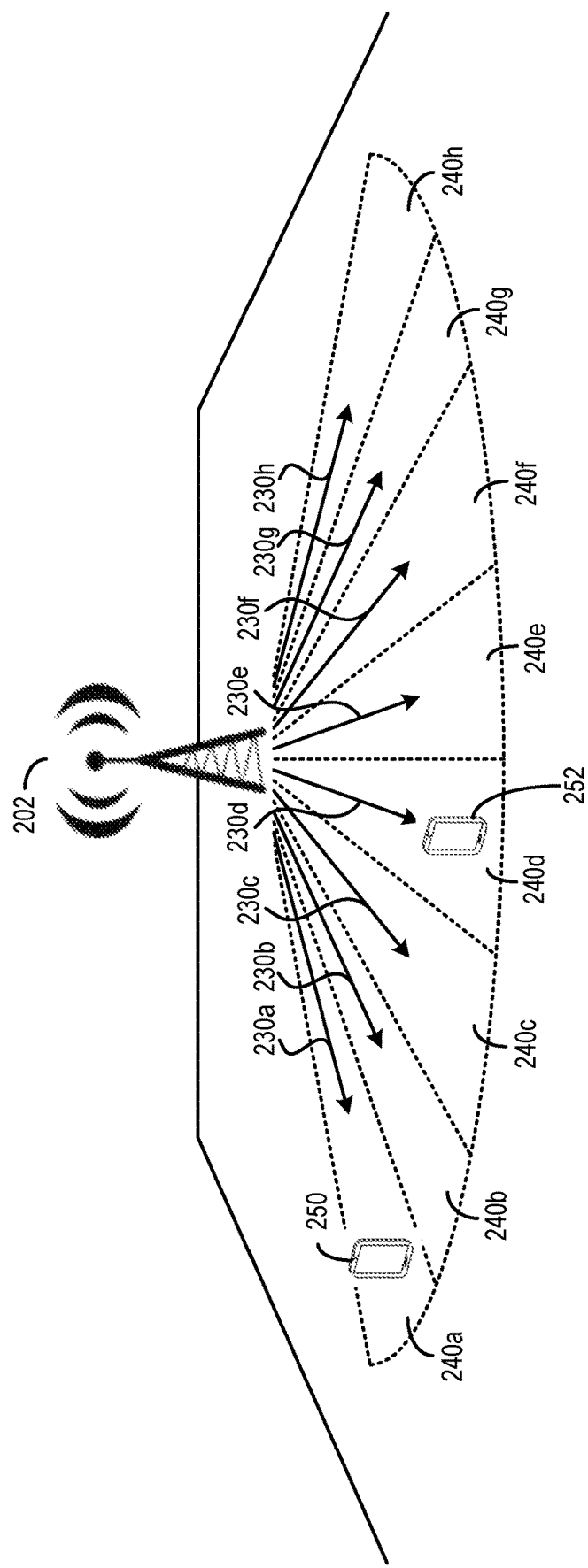

In a 5G network, antenna 202 may be configured to transmit a number of beams, with each beam having a different angle of departure (e.g., different angles of elevation and/or of azimuth) and targeted at a pre-determined geographical region. FIG. 2C illustrates an example of a beam transmission scheme by antenna 202 in a 5G network. In the example of FIG. 2C, antenna 202 may transmit beams 230a, 230b, 230c, 230d, 230e, 230f, 230g, and 230h to, respectively, one of regions 240a, 240b, 240c, 240d, 240e, 240f, 240g, and 240h. Each beam may be used for data reception and transmission and may carry signals used for radio frame synchronization and beam tracking, such as Primary Synchronization Sequences (PSS), Secondary Synchronization Sequences (SSS), Physical Broadcast Channel (PBCH) signals, Tracking Reference Signals (TRS), etc.

Radio beam 200 can include a sequence of radio frames to transmit PSS, SSS, PBCH, and TRS signals. Each radio frame may be associated with a period of transmission, and can be organized into a number of subframes. Each subframe may be further divided into a number of symbol periods, with each symbol period being used for transmission of a symbol. Each symbol can be transmitted by modulating a set of subcarriers allocated as resource elements, with each subcarrier occupying a different frequency band. Each of PSS, SSS, PBCH, and TRS signals can include a sequence of symbols formed by modulating a set of subcarriers in a set of symbol periods.

In some examples, antenna 202 may be operated by a base station (not shown in FIG. 2C) managing a cell that spans regions 240a-240h. The base station can operate antenna 202 to transmit each beam sequentially based on a schedule to each of regions 240a-240h. The beam width of an radio beam in a 5G network is typically narrower than the beam width of an radio beam in a 4G network, which allows antenna 202 to target a beam to one region (e.g., region 240a), but not to other regions (e.g., region 240b, 240c, etc.), at different scheduled times. For example, mobile device 250, located in region 240a and camping in the cell managed by the base station that operates antenna 202, may receive radio beam 230a as a direct line-of-sight beam (versus as a reflected or deflected beam) from antenna 202. However, mobile device 250 is unlikely to receive radio beam 230b as a direct line-of-sight beam. Moreover, mobile device 252, located in region 240d and also camping in the cell, may receive radio beam 230d as a direct line-of-sight beam from antenna 202.

Figure 2D:
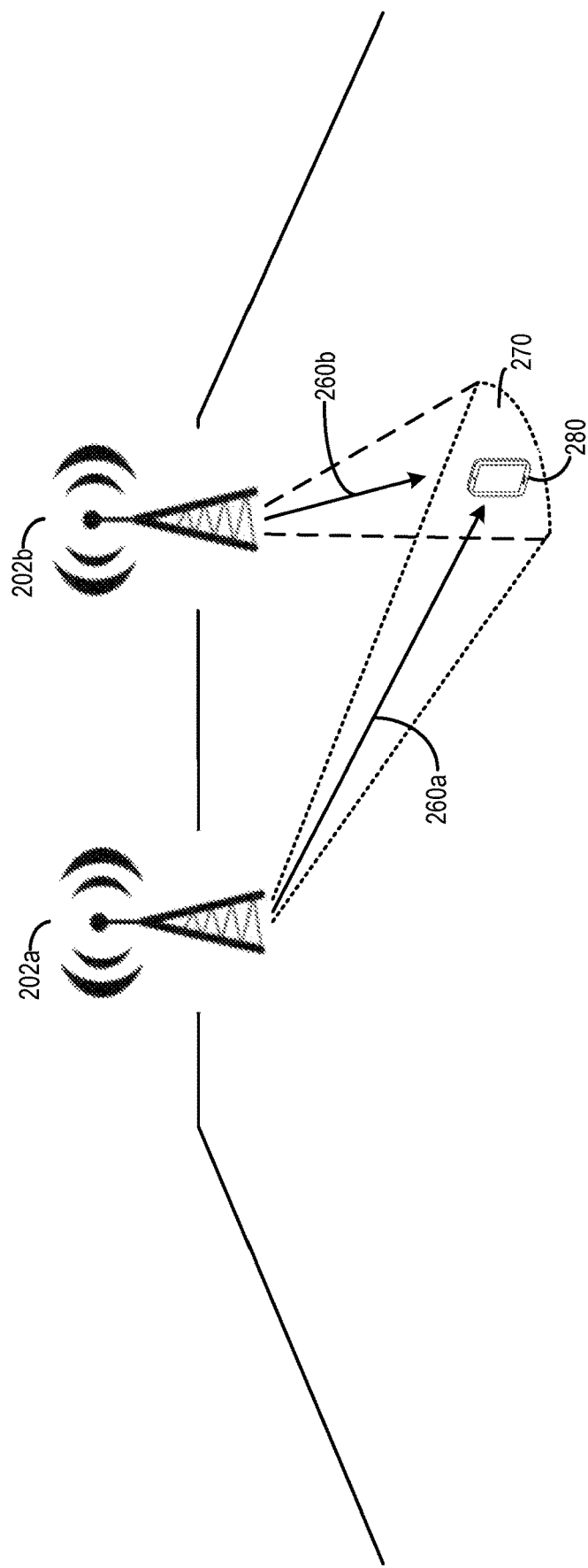

In some examples, multiple antennae can be configured to transmit different beams to a particular geographical area. The transmission of the different beams by the multiple antennae can occur either at the same time or at different times. FIG. 2D illustrates an example of a beam transmission scheme by a pair of antennae 202a and 202b in a 5G network. In the example of FIG. 2D, antenna 202a may transmit beam 260a, whereas antenna 202b may transmit beam 260b. Both beams 260a and 260b may have different angle of departure (with respect to, respectively, antennae 202a and 202b), and both beams 260a and 260b may be targeted at a region 270. A mobile device 280 at region 270 may receive both beams 260a and 260b (either at the same time or at different times). In some examples, antenna 202a may be operated by a first base station that manages a first cell and antenna 202b may be operated by a second base station that manages a second cell, region 270 may be at a boundary between the first cell and the second cell, and mobile device 280 may receive both beams 260a and 260b at region 270 as the mobile device is in a hand-over operation from the first cell to the second cell. In some examples, antenna 202a may be operated by a primary base station and antenna 202b may be operated by a secondary base station, with both the primary base station and the secondary base station that manage a cell which includes region 270 (e.g., in a carrier-aggregation scheme), and mobile device 280 may receive both beams 260a and 260b at region 270 when mobile device 280 camps in the cell.

In some examples, a mobile device can identify a received beam and/or the antenna that transmits the beam, and can perform a position measurement of the mobile device based on identifying the beam and/or identifying the antenna that transmits the beam. The mobile device can then estimate its position based on, for example, the angle of departure for each identified beam, the location of the identified antenna, a distance between the mobile device and the identified antenna, position information provided by other mobile devices that also receive the identified beam (which can indicate that the mobile devices are in the same geographical region as the mobile device), etc.

There are different ways by which a mobile device can identify a received beam, the antenna that transmits the beam, and/or the cell that operates the antenna to transmit the beam. For example, when a base station operates an antenna to perform a data transmission using a beam, the base station can include an identifier as part of the transmitted data, and the identifier can include a beam identifier that identifies a beam. The beam identifier can be unique for each beam transmitted within a cell. Upon receiving a beam, the mobile device can identify the received beam based on the beam identifier extracted from the transmitted data. The mobile device can also determine whether an identified beam is a line-of-sight beam directly transmitted from the antenna and targeted at the region in which the mobile device is located (rather than being deflected and/or reflected from other sources) based on various techniques as to be described below. Upon determining that the identified beam is a line-of-sight beam, the mobile device can refer to the stored information to determine an angle of departure of the beam and a location of the antenna that transmits the beam, and to perform a position measurement of the mobile device based on the angle of departure and the location of antenna as to be described below.

In some examples, the identifier included in the beam may also identify a base station that transmits the beam (via an antenna). For example, the identifier can be a cell identifier which is unique among different cells. Different beams transmitted within the same cell may share the same cell identifier, which the mobile device can use to identify the base station and/or antenna that transmits the beam. An identifier may be included as part of beam transmission in different ways. As an example, an identifier may be included as data encoded by the beam (e.g. as a navigation signal), where the data may be encoded at a lower bit rate than the native symbol rate of chip rate of the beam and may employ forward error correction to improve the reliability of decoding. In another example, an identifier may be associated with (e.g. may be used to help define) a coding scheme for the beam, with a UE detecting the identifier by successfully acquiring and measuring the beam using the particular coding scheme.

The mobile device may also rely on other information to identify the base station. For example, the mobile device may receive scheduling information which indicates the different time slots at which the base station transmits the beams, with one beam being transmitted in each time slot. Based on the current time information and the time slots information, the mobile device can identify a received beam and its angle of departure. The mobile device can also determine that the identified beam is a line-of-sight beam based on techniques to be described below. Upon determining that the identified beam is a line-of-sight beam, the mobile device can also perform a position measurement of the mobile device based on the angle of departure and the location of the antenna as to be described below.

Based on identifying a beam and/or a base station, the mobile device can perform a position measurement. For example, as discussed above, the mobile station may receive a list of cell parameters, such as antenna location, radio beam direction, antenna pattern, etc. that are associated with the identity of a cell and/or radio beam. In another example, the coverage area of a cell may be indicated as a bounded geographic area where the cell is expected to be detected. The expected coverage information can be stored in a location server database. By identifying a cell and/or a beam, and based on the cell parameters and/or expected coverage information mapped to the identified cell and/or the identified beam, the mobile device can estimate its location.

In some examples, the mobile device can also provide its location estimate to a network, which can also estimate the location of the mobile device (e.g., to determine a position fix) based on the location estimate (or measurement) information provided by the mobile device. For example, as discussed above, the mobile device may also receive a list of reference cell and candidate neighbor cells for which to attempt measurements. The mobile device can perform location measurement (e.g., by identifying a cell, by identifying a radio beam, and/or by determining the location of the mobile device, etc.), and then report its measurement (e.g., an identified cell, an identified beam, a location of the mobile device, etc.) to a location server. In some examples, the location server can also compute the location of the mobile device based on the location measurement reported by the mobile device and the expected coverage information from the location server database including, for example, antenna locations, radio beam direction, antenna pattern, bounded geographic area, etc. associated with the identified cell and/or the identified radio beam. For example, the location server can determine an antenna location and an radio beam direction, etc. based on the identification of the cell and/or beam, and determine a position of the mobile device based on the antenna location and direction. As another example, the location server can determine the bounded geographic area of the mobile device, and determine the location of the mobile device based on the bounded geographic area. As another example, the location server can determine a set of other mobile devices that also report identifying the same beam and/or the same cell as the mobile device. The location server can retrieve the reported locations of the set of other mobile devices as part of the expected coverage information, and determine the location of the mobile device based on the reported locations of the set of other mobile devices.

Figure 3A:
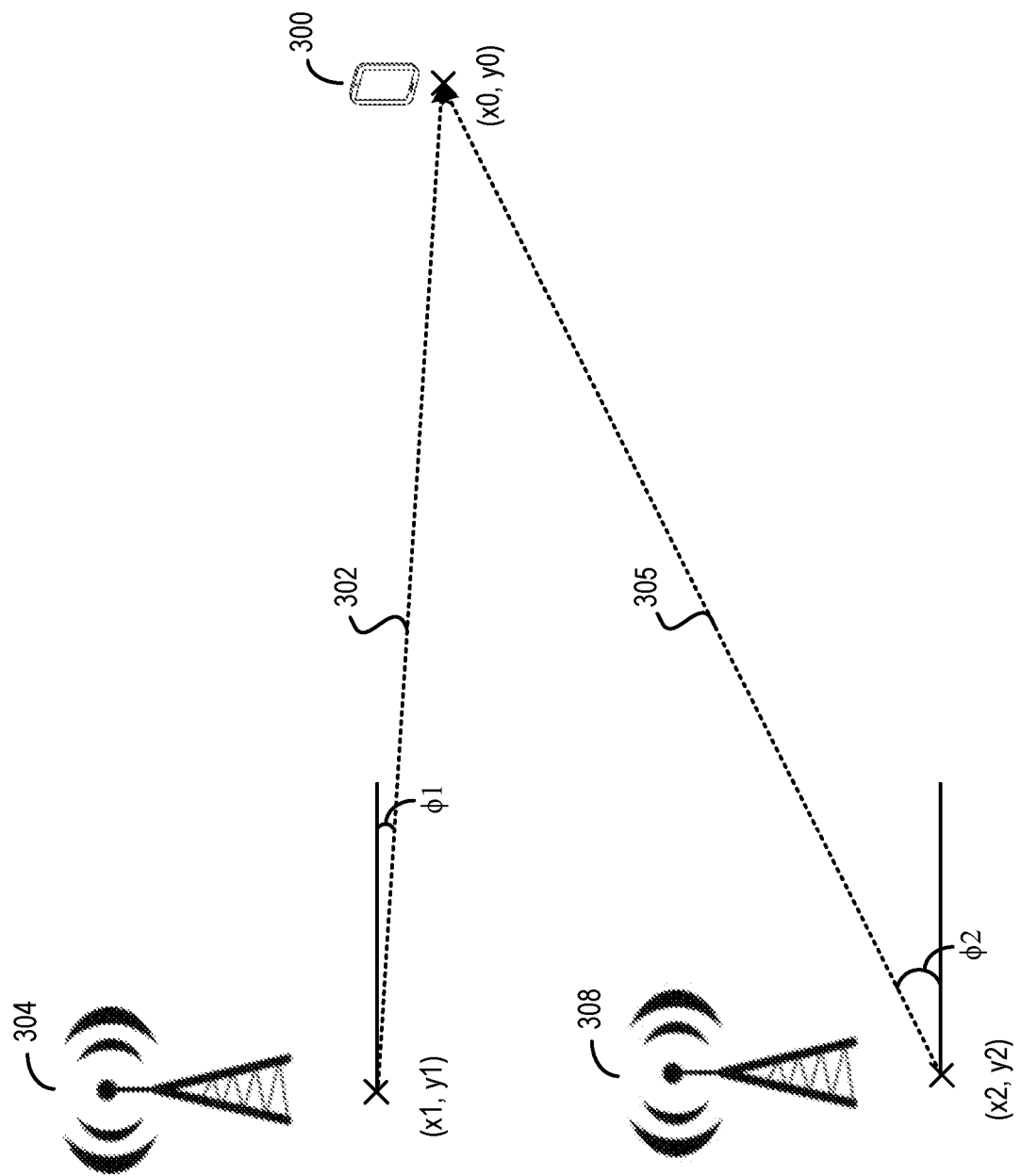
FIGS. 3A-3C represent examples of performing position measurement based on identifying one or more radio beams, according to some embodiments.
Figure 3B:
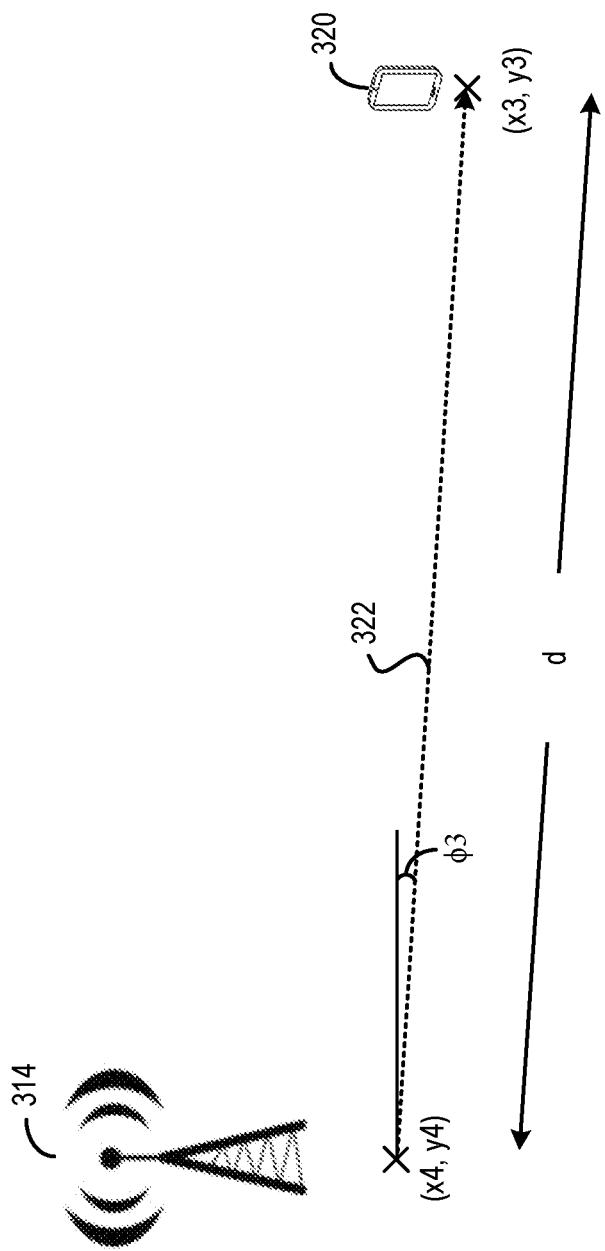
Figure 3C:
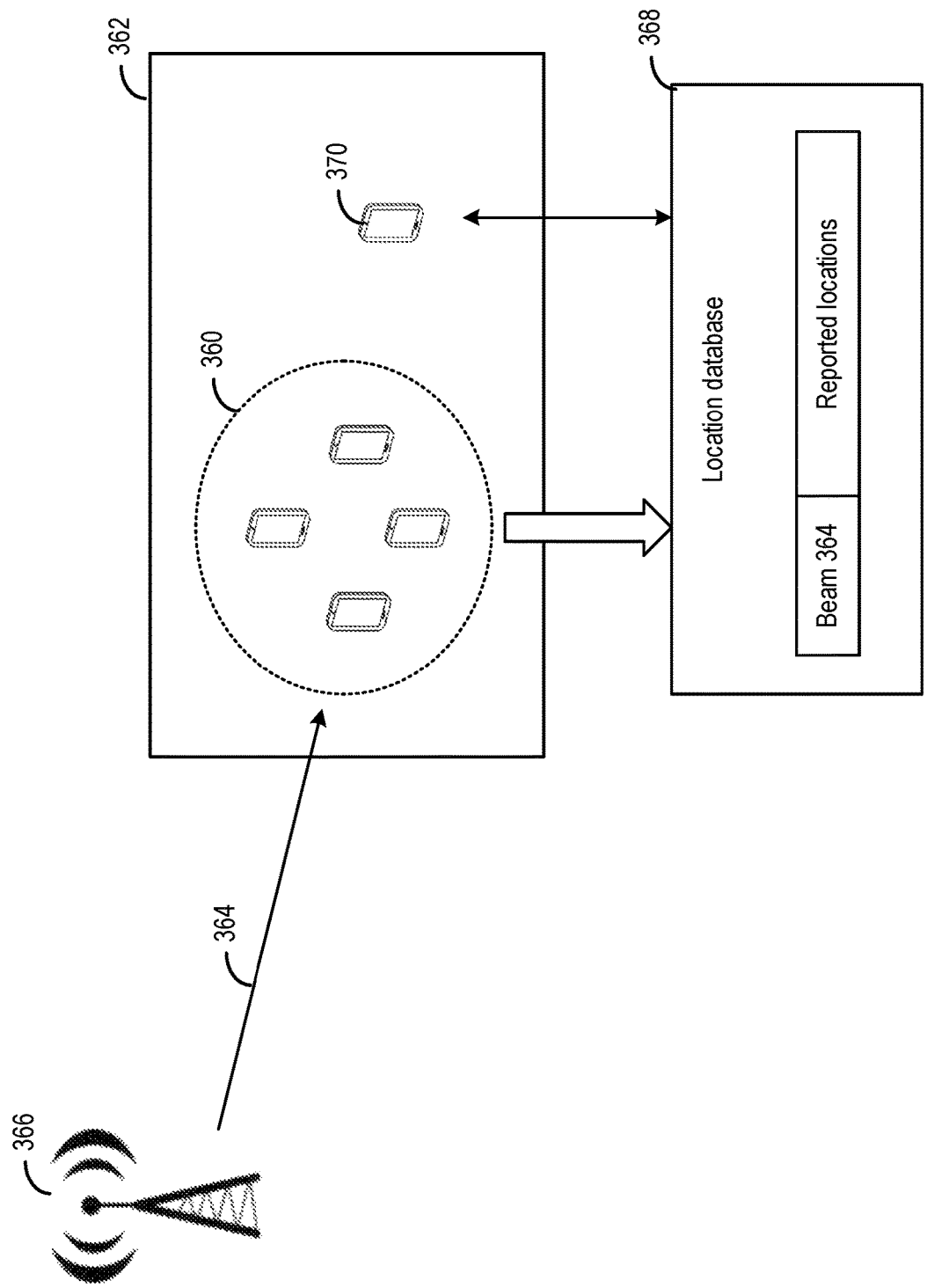

Reference is now made to FIGS. 3A-3C, which illustrate examples of position measurements that can be performed by a mobile device based on one or more beams received from one or more antennae. FIG. 3A illustrates an example of a mobile device performing a position measurement based on beams received from a plurality of antennae. In the example of FIG. 3A, a mobile device 300, at a location associated with two-dimensional coordinates (x0, y0), may receive a beam 302 from an antenna 304 and a beam 306 from an antenna 308. Beam 302 may have a first angle of departure $\phi 1$, whereas beam 306 may have a second angle of departure $\phi 2$, both of which can be on the azimuth plane and measured with respect to a common axis (e.g., a Y-axis). The location of antenna 304 can be associated with two-dimensional coordinates (x1, y1), whereas the location of antenna 308 can be associated with two-dimensional coordinates (x2, y2). Mobile device 300 can identify beams 302 and 305 based on, for example, a beam identifier, a cell identifier, a time of reception of the beams, etc., as described above, and obtain their angle of departures. Mobile device 300 can also determine that both beams 302 and 305 are line-of-sight beams targeted at a region in which mobile device 300 is located (based on techniques to be discussed below). Mobile device 300 can perform computations to solve a set of equations to determine the coordinates (x0, y0) of mobile device 300 as an intersection point between beams 302 and 305, as follows:

$$\tan(\phi 1) = \frac{y1 - y0}{x1 - x0} \quad \text{(Equation 1)}$$

$$\tan(\phi 2) = \frac{y0 - y2}{x0 - x2} \quad \text{(Equation 2)}$$

In Equations 1 and 2, the location coordinates (x0, y0) of mobile device 300 can be related to the location coordinates of each of antennae 304 (x1, y1) and 308 (x2, y2) based on a tangent function (tan) of the angles of departure ($\phi 1$, $\phi 2$). The location coordinates (x0, y0) can be determined by solving Equations 1 and 2 above.

FIG. 3B illustrates an example of mobile device performing a position measurement based on a single beam transmitted by a single antenna. In the example of FIG. 3B, a mobile device 320, positioned at a location associated with coordinates (x3, y3), may receive a beam 322 from an antenna positioned at a location associated with coordinates (x4, y4). Beam 322 may have an angle of departure $\phi 3$ (e.g., with respect to a Y-axis) on the azimuth plane. Mobile device 320 can identify beam 322 based on, for example, a beam identifier, a cell identifier, a time of reception of the beams, etc., as described above, and obtain the angle of departure of beam 322. Mobile device 320 can also determine that beam 322 is a line-of-sight beam targeted at a region in which mobile device 320 is located (based on techniques to be discussed below). Mobile device 320 can then estimate a distance (d) between the mobile device and antenna 314. Based on the distance d, as well as the location coordinates (x4, y4) of antenna 314, mobile device 320 can determine its location coordinates (x3, y3) as follows:

$$x3 = x4 + d \times \cos(\phi 3) \quad \text{(Equation 3)}$$

$$y3 = y4 + d \times \sin(\phi 3) \quad \text{(Equation 4)}$$

In Equations 3 and 4 above, the location coordinates (x3, y3) of mobile device 320 can be related to the location coordinates (x4, y4) of antenna 314 based on sine (sin) and cosine (cos) functions of the angle of departure ($\phi 3$).

In the examples of FIGS. 3A and 3B, examples of two-dimensional coordinates on a single plane are provided to simplify the illustration. It is understood that the position measurements in the examples of FIGS. 3A and 3B can be performed based on three-dimensional coordinates and multiple angle of departures on different planes.

There are various ways by which mobile device 320 can estimate the distance (d) between the mobile device and antenna 314. In one example, mobile device 320 may receive a Timing Advance command from a base station that operates antenna 314. Timing Advance is part of the feedback control loop to ensure that signals from different UEs arrive at a common serving cell at a closely similar point in time. The Timing Advance command may include a timing offset to synchronize downlink and uplink subframes at the base station. The timing offset can be configured based on a propagation delay between mobile device 320 and antenna 314. Each mobile device can receive timing offset information that reflects its distance from antenna 314. Each mobile device can set a timing of its uplink transmission to antenna 314 to avoid collision and interference among the uplink transmissions at antenna 314. The base station can estimate the initial timing offset based on Physical Random Access Channel (PRACH) preambles transmitted by mobile device 320, and transmit the estimated timing offset in the form of a Timing Advance command in a Random Access Response (RAR) back to mobile device 320. Mobile device 320 can then estimate the propagation delay as well as its distance from antenna 314 based on the timing offset information in the Timing Advance command.

Besides Timing Advance command, there are other ways by which mobile device 320 can estimate the distance. For example, mobile device 320 may determine a time-of-flight of a particular signal (e.g., PSS, SSS, PBCH, TRS, etc.) transmitted in the beam, and estimate the distance based on the time-of-flight. The base station may report a time of transmission of the signal to mobile device 320 which, upon receiving the signal from the beam, can also determine a time of reception of the signal, and then determine the time-of-flight based on a difference between the time of transmission and the time of reception of the signal. As another example, mobile device 320 may also determine a ratio of transmitted power of the beam at antenna 314 (which can be reported by the base station) and the received power of the beam at mobile device 320, and estimate the distance based on the ratio and a free-space path loss formula.

FIG. 3C illustrates another example of position measurements that can be performed by a mobile device based on a beam received from an antenna. In the example of FIG. 3C, a plurality of mobile devices 360, located in a region 362, may receive beam 364 from antenna 366. Each of the plurality of mobile devices 360 may perform a position measurement (e.g., based on the techniques described above, or based on other sources such as global positional signals (GPS), Wi-Fi, etc.), and report its position to a location database 368. In some examples, location database 368 can store a mapping table that maps beam 364 (e.g., based on a beam identifier, a time of reception of a beam associated with a cell identifier, etc.) with a set of locations of the plurality of mobile devices 360. The set of locations may have been reported by mobile devices 360 and/or previously determined by the cell for mobile devices 360. In some examples, location database 368 can also map a cell identifier with a bounded geographic area where the cell is expected to be detected. A mobile device 370, which is located in region 362, may also receive and identify a beam (e.g., beam 364). Mobile device 370 may also receive information that identifies the cell that operates the antenna to transmit the beam. Mobile device 370 can query location base station 368 for, for example, the locations associated with the identified beam, the bounded geographical area associated with a cell, etc., and the query may include a beam identifier, cell identifier, the time of reception of the beam, etc. Based on the beam identifier, the cell identifier, and/or time of reception, location database 368 can estimate a location of mobile device 370. Mobile device 370 can also determine its position based on the location information received from location database 368. For example, mobile device 370 can compute an average of the reported locations, use the bounded geographical area information to augment/refine its own position measurement result, etc.

As discussed above, before a mobile device can use an identified beam for position measurement based on the techniques described above, the mobile device may need to determine whether the identified beam is a line-of-sight beam directly transmitted from an antenna and targeted at the area in which the mobile device is located. However, if the identified beam is targeted at other areas and is not a line-of-sight beam, the mobile device may have received the identified beam due to a reflection or deflection by other structures. In such a case, the mobile device should avoid performing position measurement based on the identified beam.

Figure 4A:
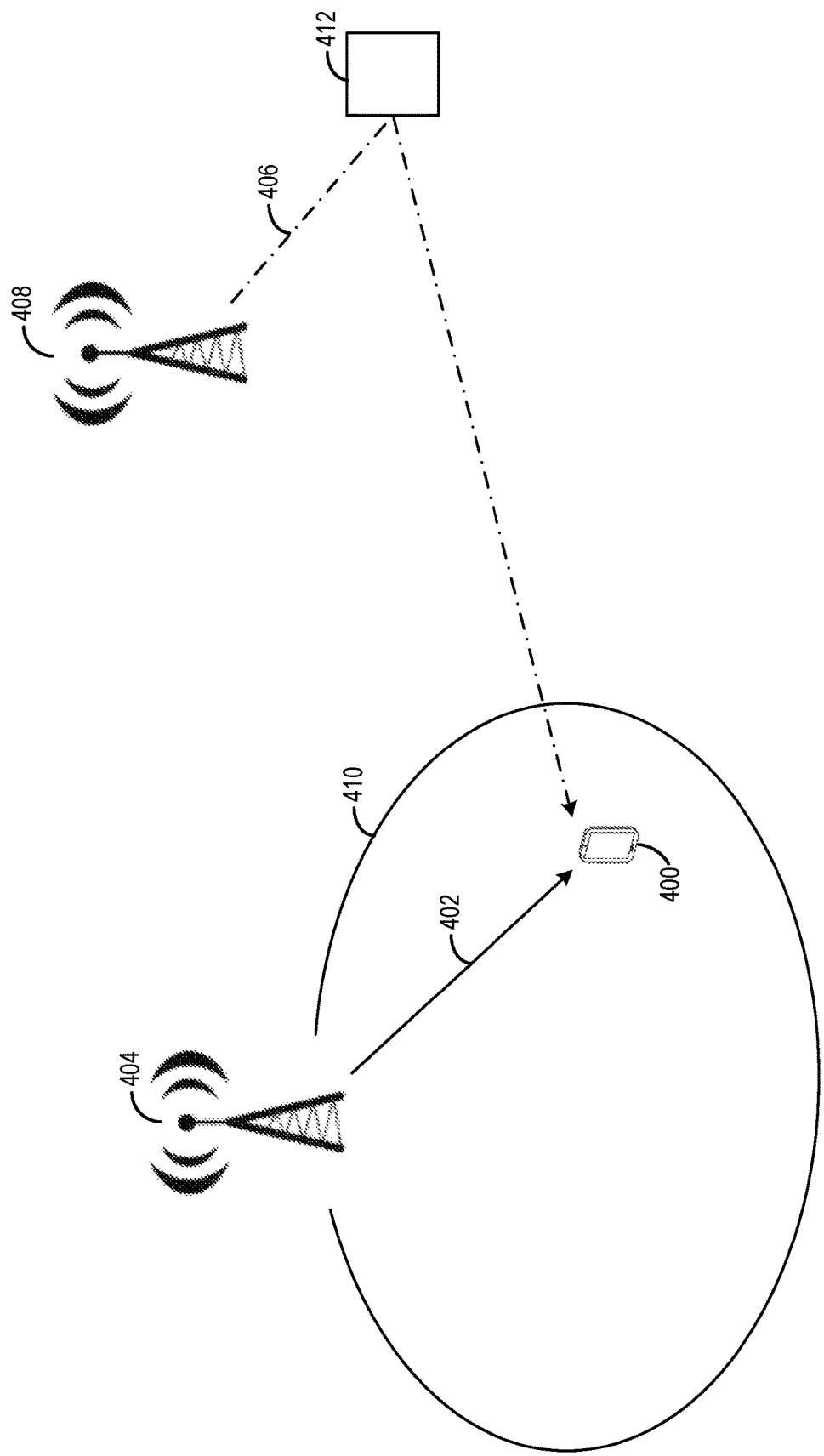
FIGS. 4A-4C represent examples of determining a line-of-sight radio beam for performing position measurements, according to an embodiment.
Figure 4B:
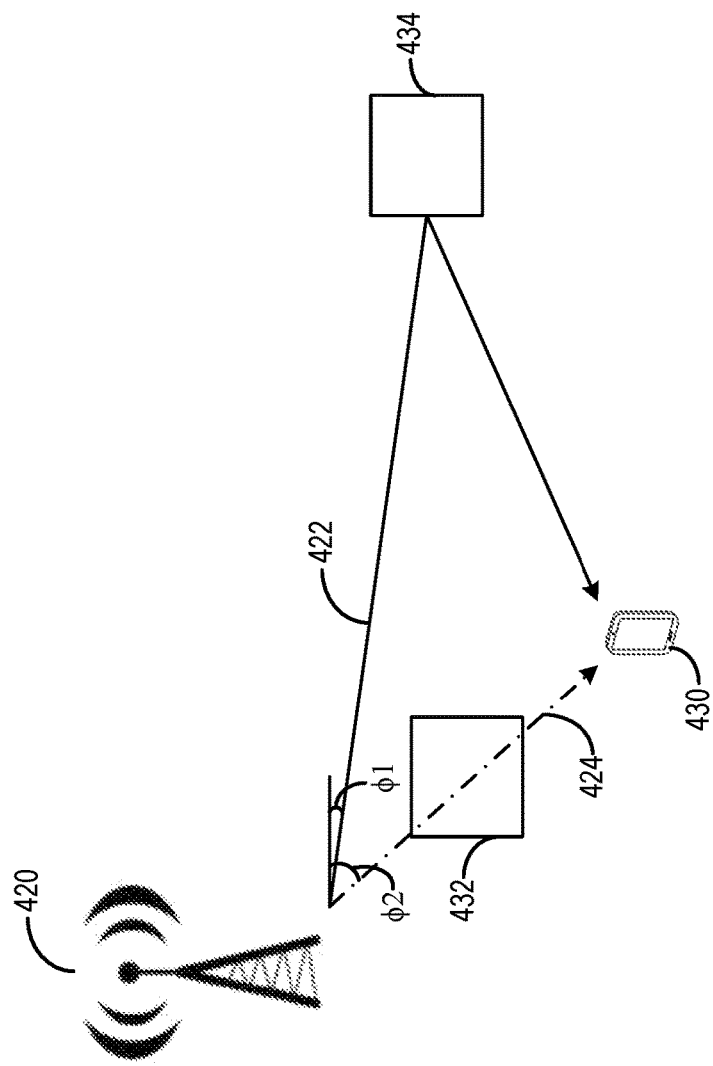
Figure 4C:
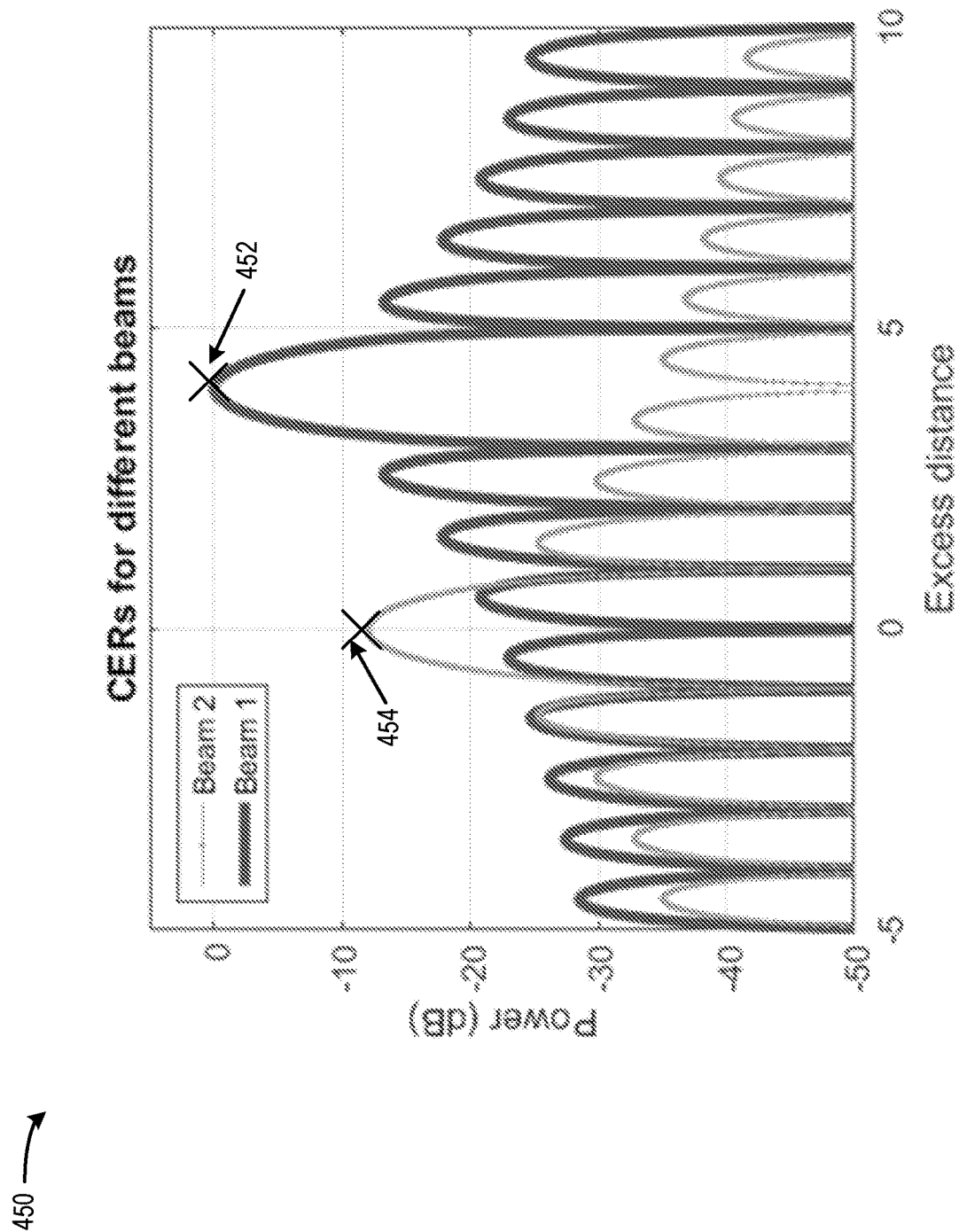

FIGS. 4A-4C illustrate techniques that can be employed by a mobile device to determine whether a received beam is a line-of-sight beam or a reflected/deflected beam. In the example of FIG. 4A, a mobile device 400 may receive a beam 402 from an antenna 404 and a beam 406 from an antenna 408. Antenna 404 may be operated by a base station (not shown in FIG. 4A) that manages a cell 410 in which mobile device 400 camps, and beam 402 may be targeted at an area in which mobile device 400 is located. Antenna 408 may target beam 406 at a different location from where device 400 is located, but beam 406 is reflected by a structure 412 and reaches mobile device 400. Mobile device 400 may determine that beam 402 is a line-of-sight beam and perform a position measurement based on, for example, the angle of departure of beam 402 and the location of antenna 404, while ignoring beam 406.

There are various ways by which mobile device 400 can determine that beam 402 is a line-of-sight beam. In some examples, each of beam 402 and beam 406 may include a beam identifier and/or a cell identifier. Mobile device 400 may ignore beam 406 based on, for example, the cell identifier of beam 406 not identifying the cell in which mobile device 400 camps. Mobile device 400 may also ignore beam 406 based on, for example, the beam identifier of beam 406 not matching an identifier of a beam mobile device 400 is scheduled to receive at the time of reception. In some examples, mobile device 400 may also ignore beam 406 based on a lower peak received power of beam 406 compared with that of beam 402. In the example of FIG. 4A, the peak received power of beam 406 may be lower than that of beam 402 due to a larger degree of attenuation caused by a longer path travelled by beam 406. Based on a higher received power, mobile device 400 may determine that beam 402 travels the shortest distance and is more likely to be a line-of-sight beam targeted at the area in which mobile device is located.

In some scenarios, the received power may not provide an accurate indication of a line-of-sight beam. FIG. 4B illustrates an example of such a scenario. In the example of FIG. 4B, an antenna 420 may transmit a beam 422 with a first angle of departure φ1 (e.g., with respect to a Y-axis) and a beam 424 with a second angle of departure φ2 (e.g., with respect to the Y-axis). Beams 422 and 424 may be transmitted at different times. Beam 422 may be targeted at an area in which mobile device 430 is located. However, beam 422 may be obstructed (partially) by a structure 432 before beam 422 reaches mobile device 430. Moreover, beam 424 is targeted at a different location from where mobile device 430 is located. However, beam 424 also reaches mobile device 430 after being reflected off a structure 434.

FIG. 4C illustrates an example of chart 450 which shows a relationship between the power of beams 422 and 424 as received at mobile device 430 with respect to travel distances by each beam. As shown in chart 450, mobile device 430 may receive beam 424 (denoted as "Beam 2" in chart 450) as a weaker beam than beam 422 (denoted as "Beam 1" in chart 450), despite beam 424 being the line-of-sight beam and having travelled through a shorter distance than beam 422.

Referring back to FIG. 4B, mobile device 430 may determine that beam 422 is the line-of-sight beam based on, for example, performing a relative time of arrival measurements between beams 422 and beam 424. For example, mobile device 430 may receive a time of transmission (or other indication) of a pre-determined signal (e.g., PSS, SSS, PBCH, TRS, etc.) at antenna 420, and monitor for reception of the pre-determined signal. Mobile device 430 may determine a first timestamp of receiving the pre-determined signal via beam 424 (e.g., by detecting the first timestamp corresponding to a detection of a peak 454 in chart 450), and a second timestamp of receiving the pre-determined signal via beam 422 (e.g., by detecting the second timestamp corresponding to a detection of a peak 452 in chart 450). By comparing the first timestamp versus the second timestamp (and confirming that both timestamps are after the time of transmission of the pre-determined signal at antenna 420), mobile device 430 may determine that beam 424 is the line-of-sight beam due to the earlier first timestamp. Mobile device 430 can also estimate its distance from antenna 420 by, for example, estimating a time-of-flight of beam 422 based on a difference between the time of transmission of the pre-determined signal and the first timestamp. In some examples, mobile device 430 can also adjust the timing offset received from the timing advance command based on the estimated time-of-flight, and determine the distance based on the adjusted timing offset, to further improve the accuracy of the distance determination.

Figure 5:
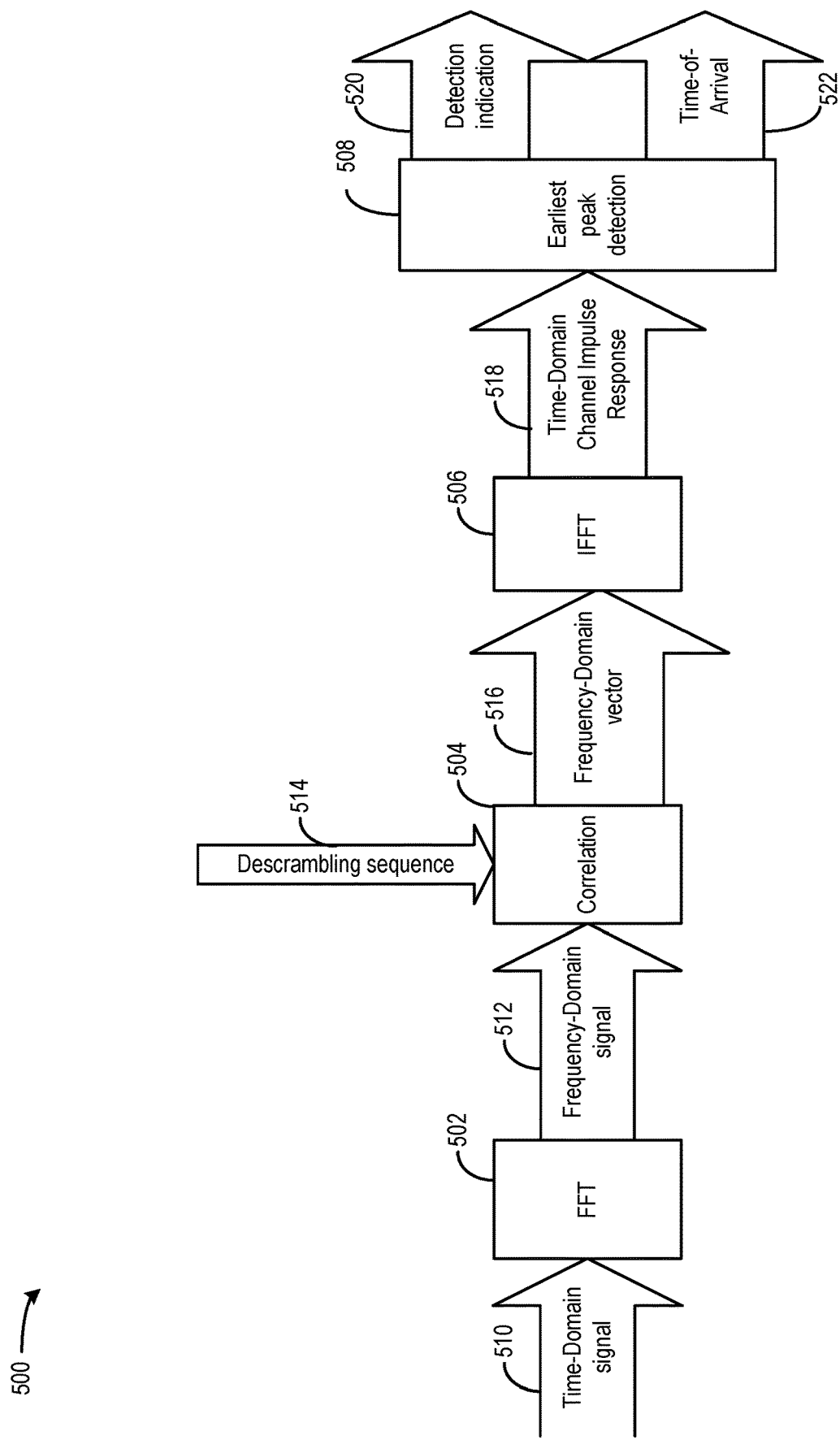
FIG. 5 is a block diagram illustrating a receiver system at a UE, according to an embodiment.

FIG. 5 illustrates an example of a receiver system 500 at a mobile device which can extract information from a radio beam for position measurement. Receiver system 500 may include a block 502 for performing Fast Fourier Transform (FFT), a block 504 for performing correlation operation, a block 506 for performing Inverse Fast Fourier Transform (IFFT), and a block 508 for performing earliest peak detection. The functionalities of receiver system 500 may be implemented by, for example, executing a set of software instructions on a hardware processor, an application specific integrated circuit (ASIC), etc.

Receiver system 500 may interface with an antenna to receive a radio beam in the form of a time-domain signal 510, and an analog-to-digital converter (ADC) coupled with the antenna to generate digital samples of the time-domain signal 510. The digital samples can be processed by the FFT block 502 to obtain a frequency-domain signal 512, which can include frequency-domain representation of each symbol included in the radio beam. Each tap of the FFT output can correspond to one of the modulated set of subcarriers that represent the symbol. The FFT output can be processed by the correlation block 504. Correlation block 504 can also receive a descrambling sequence 514 including a complex conjugate of each of the modulated subcarriers for each symbol. Correlation block 504 can perform correlation operation for each modulated subcarrier to generate one or more correlation products for each of the symbols that includes a resource element corresponding to the modulated subcarrier. For each modulated subcarrier, the correlation product can be copied, or averaged if multiple symbols contain the same subcarrier, to form a frequency-domain vector 516, with each entry of the frequency-domain vector representing the amplitude and the phase of a subcarrier.

Frequency-domain vector 516 can be processed using the IFFT block 506 to generate a time-domain Channel Impulse Response (CIR) 518. From the CIR we can generate a Channel Energy Response (CER) similar to as shown in chart 450 of FIG. 4C. Time-domain CIR 518, or alternatively its CER counterpart, can be processed by earliest peak detection block 508 to generate, for example, a peak detection indication 520 and time-of-arrival 522. Peak detection indication 520 can be generated based on, for example, detecting a peak of which the power level exceeds a pre-determined threshold, whereas time-of-arrival 522 can be timestamps associated with the detected peaks. Detection indication 520 and time-of-arrival 522 can be provided to downstream logic to perform additional processing for position measurement. For example, the downstream logic may determine the radio beam that provides the peak with the earliest time-of-arrival is the line-of-sight radio beam, and the time-of-arrival 522 information can be used to estimate a distance between the mobile device and the antenna. In addition, CIR 518 may also be used to extract other information including, for example, a beam identifier, a cell identifier, etc., which the mobile device can use to obtain angle of departure information of the beam to perform position measurement.

Figure 6:
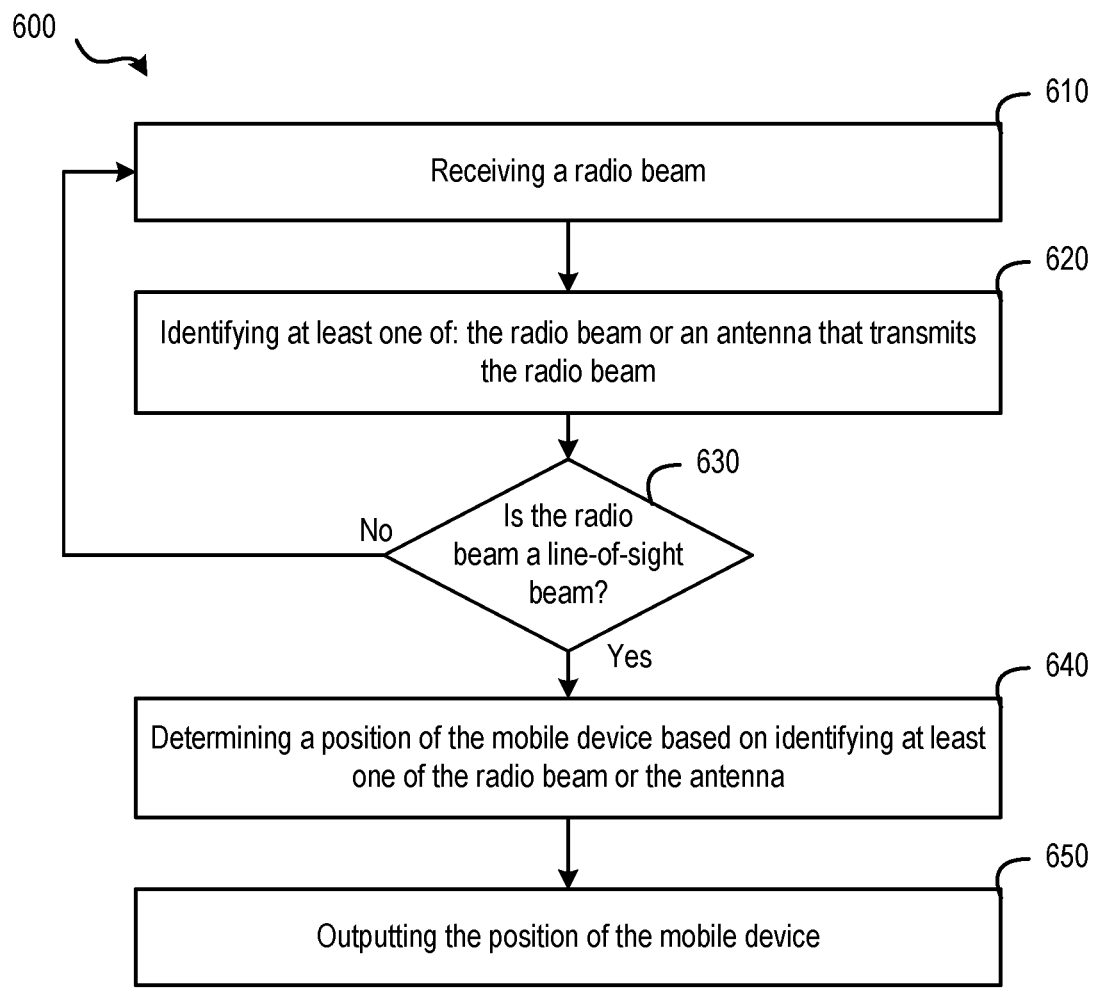
FIG. 6 is a flow diagram illustrating a method of performing position measurements at a UE, according to an embodiment.
Figure 7:
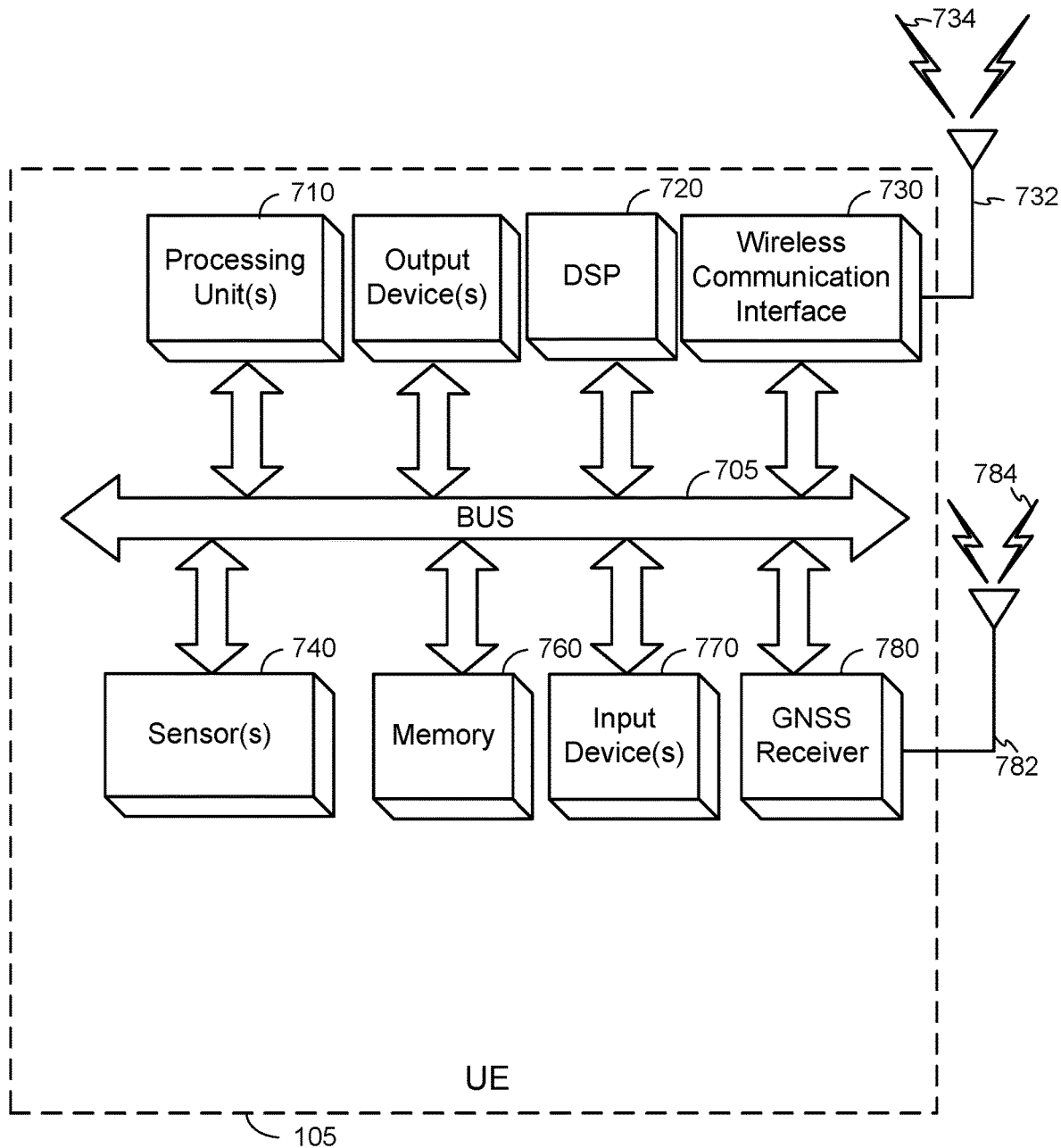
FIG. 7 is an embodiment of a UE.

FIG. 6 is a flow diagram illustrating a method 600 of performing a position measurement at a mobile device. FIG. 6 illustrates the functionality of a mobile device (e.g., UE 105) according to aspects of embodiments described above. According to some embodiments, functionality of one or more blocks illustrated in FIG. 6 may be performed by a UE (e.g., UE 105). Means for performing these functions may include software and/or hardware components of a UE 105, as illustrated in FIG. 7 and described in more detail below.

At block 610, the functionality includes receiving a radio beam. The radio beam can be sampled to generate a set of digital signals. Means for performing the functions at block 610 may comprise a bus 705, processing unit(s) 710, wireless communication interface 730, memory 760, GNSS receiver 780, and/or other hardware and/or software components of a UE 105 as illustrated in FIG. 7 and described in more detail below.

At block 620, the functionality includes identifying at least one of: the radio beam or an antenna that transmits the radio beam. The identification can be based on, for example, an identifier included in the data received via the radio beam. In some examples, the identifier can include a beam identifier that identifies a beam. The beam identifier can be unique for each beam transmitted within a cell. In some examples, the identifier may also identify a base station and/or the antenna that transmits the beam. For example, the identifier can be a cell identifier which is unique among different cells. Different beams transmitted within the same cell may share the same cell identifier, which the mobile device can use to identify the base station and/or antenna that transmits the beam. In some examples, the beam can also be identified based on other information. For example, the mobile device may receive scheduling information (e.g., from LPP and/or NPP messages), which indicates the different time slots at which a base station transmits the beams, with one beam being transmitted in each time slot. Based on the current time information and the time slots information, the mobile device can identify a received beam. Means for performing the functions at block 620 may comprise a bus 705, processing unit(s) 710, wireless communication interface 730, memory 760, GNSS receiver 780, and/or other hardware and/or software components of a UE 105 as illustrated in FIG. 7 and described in more detail below.

At block 630, the functionality includes determining whether the received radio beam is a line-of-sight beam directed at an area in which the mobile device is located. In some examples, the determination can be based on a beam identifier and/or a cell identifier included as part of the data received via the radio. The mobile device may ignore the received radio beam and proceed back to block 610 to receive a new radio beam for position measurement when, for example, the cell identifier of the radio beam does not identify the cell in which mobile device camps, the beam identifier of the radio beam not matching an identifier of a radio beam the mobile device is scheduled to receive at the time of reception, etc. In some examples, the received radio beam can also be ignored based on, for example, the peak received power of the radio beam being lower than a pre-determined threshold. In some examples, multiple radio beams may be received at block 610, and a radio beam can be identified as the line-of-sight beam based on the time-of-arrival of that radio beam (e.g., based on detecting a peak signal) being earlier than the time-of-arrivals of other radio beams. Means for performing the functions at block 630 may comprise a bus 705, processing unit(s) 710, wireless communication interface 730, memory 760, GNSS receiver 780, and/or other hardware and/or software components of a UE 105 as illustrated in FIG. 7 and described in more detail below.

At block 640, the functionality includes responses determining that the radio beam is a line-of-sight beam, determining a position of the mobile device based on identifying at least one of the radio beam or the antenna. In some examples, the determination of the position can be based on, for example, an angle of departure of the identified radio beam (or a radio beam received from an identified base station), a location of the identified antenna, etc. Information about the angle of departure can be received from the base station (e.g., as part of LPP and/or NPP messages) including, for example, a mapping between the angle of departures and the radio beams. In a case where multiple radio beams are received from multiple antennae, and the angle of departures of the multiple radio beams are determined, the position of the mobile device can be determined as an intersection point along the propagation paths of the multiple radio beams and based on, for example, the locations of the multiple antennae and Equations 1 and 2 as described above. In some examples, the position of the mobile device can also be determined based on, in addition to the angle of departure of the received radio beam, a distance between the mobile device and the antenna and Equations 3 and 4 as described above. The distance can be determined based on, for example, a Timing Advance from a base station the transmits the radio beam. The timing advance command may include a timing offset to synchronize downlink and uplink subframes at the base station. The timing offset can be configured based on a propagation delay between the mobile device and the antenna. In some examples, the distance can also be determined based on, for example, a time-of-flight of a particular signal (e.g., PSS, SSS, PBCH, TRS, etc.) transmitted in the radio beam. The time-of-flight can be determined based on, for example, a time of transmission of the signal reported by the base station and a time of reception of the signal at the mobile device.

In some examples, the mobile device may receive a list of a list of cell parameters, such as antenna location, radio beam direction, antenna pattern, etc. that are associated with the identity of a cell and/or radio beam. In another example, the coverage area of a cell may be indicated as a bounded geographic area where the cell is expected to be detected. The expected coverage information can be stored in a location server database. By mapping the cell parameters with the cell identifier of the identified cell (and/or the radio beam identifier of the identified radio beam), the mobile device can determine, for example, a target coverage area of the base station that transmits the beam, etc. The mobile device can also determine its location based on the target coverage area.

In some examples, the position measurement can be performed based on location information reported by or generated for a plurality of other mobile devices that also receive the same radio beam. For example, the plurality of mobile devices may perform position measurements and report their positions to a location database. The location database can store a mapping table that maps the radio beam (e.g., based on a beam identifier, a time of reception of a beam associated with a cell identifier, etc.) with a set of locations reported by the plurality of mobile devices. For example, at block 640, the mobile device may also query the location database for reported locations associated with the identified beam and/or the identified base station that transmits the beam (identified at block 620). The position of the mobile device can be determined based on the location information received from location database.

Means for performing the functions at block 640 may comprise a bus 705, processing unit(s) 710, wireless communication interface 730, memory 760, GNSS receiver 780, and/or other hardware and/or software components of a UE 105 as illustrated in FIG. 7 and described in more detail below.

At block 650, the functionality includes outputting the position of the mobile device. For example, information about the position of the mobile device can be output through an interface (e.g., a display interface, an audio interface, etc.) of the mobile device. The information can also be provided to other applications such as navigation application, to a location database, to the base station, etc. Means for performing the functions at block 650 may comprise a bus 705, processing unit(s) 810, wireless communication interface 730, memory 760, GNSS receiver 780, and/or other hardware and/or software components of a UE 105 as illustrated in FIG. 7 and described in more detail below.

FIG. 7 illustrates an embodiment of a UE 105, which can be utilized as described herein above (e.g. in association with FIGS. 1-6). For example, the UE 105 can perform one or more of the functions of method 600 of FIG. 6. It should be noted that FIG. 7 is meant only to provide a generalized illustration of various components, any or all of which may be utilized as appropriate. It can be noted that, in some instances, components illustrated by FIG. 7 can be localized to a single physical device and/or distributed among various networked devices, which may be disposed at different physical locations (e.g., located at different parts of a user's body, in which case the components may be communicatively connected via a Personal Area Network (PAN) and/or other means).

The UE 105 is shown comprising hardware elements that can be electrically coupled via a bus 705 (or may otherwise be in communication, as appropriate). The hardware elements may include a processing unit(s) 710 which can include without limitation one or more general-purpose processors, one or more special-purpose processors (such as digital signal processing (DSP) chips, graphics acceleration processors, application specific integrated circuits (ASICs), and/or the like), and/or other processing structure or means. As shown in FIG. 7, some embodiments may have a separate DSP 720, depending on desired functionality. Location determination and/or other determinations based on wireless communication may be provided in the processing unit(s) 710 and/or wireless communication interface 730 (discussed below). The UE 105 also can include one or more input devices 770, which can include without limitation a touch screen, a touch pad, microphone, button(s), dial(s), switch(es), and/or the like; and one or more output devices 715, which can include without limitation a display, light emitting diode (LED), speakers, and/or the like.

The UE 105 might also include a wireless communication interface 830, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMax device, cellular communication facilities, etc.), and/or the like, which may enable the UE 105 to communicate via the networks described above with regard to FIG. 1. The wireless communication interface 730 may permit data to be communicated with a network, eNBs, gNBs, and/or other network components, computer systems, and/or any other electronic devices described herein. The communication can be carried out via one or more wireless communication antenna(s) 732 that send and/or receive wireless signals 734.

Depending on desired functionality, the wireless communication interface 730 may comprise separate transceivers to communicate with base stations (e.g., eNBs and gNBs) and other terrestrial transceivers, such as wireless devices and access points. The UE 105 may communicate with different data networks that may comprise various network types. For example, a Wireless Wide Area Network (WWAN) may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16), and so on. A CDMA network may implement one or more radio access technologies (RATs) such as cdma2000, Wideband-CDMA (W-CDMA), and so on. Cdma2000 includes IS-95, IS-2000, and/or IS-856 standards. A TDMA network may implement Global System for Mobile Communications (GSM), Digital Advanced Mobile Phone System (D-AMPS), or some other RAT. An OFDMA network may employ LTE, LTE Advanced, and so on. 5G, LTE, LTE Advanced, GSM, and W-CDMA are described in documents from 3GPP. Cdma2000 is described in documents from a consortium named "3rd Generation Partnership Project 2" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The UE 105 can further include sensor(s) 740. Such sensors may comprise, without limitation, one or more inertial sensors (e.g., accelerometer(s), gyroscope(s), and or other IMUs), camera(s), magnetometer(s), altimeter(s), microphone(s), proximity sensor(s), light sensor(s), and the like, some of which may be used to complement and/or facilitate the position determination described herein.

Embodiments of the UE 105 may also include a GNSS receiver 780 capable of receiving signals 784 from one or more GNSS satellites (e.g., SVs 190) using an GNSS antenna 782. Such positioning can be utilized to complement and/or incorporate the techniques described herein. The GNSS receiver 780 can extract a position of the UE 105, using conventional techniques, from GNSS SVs of a GNSS system, such as Global Positioning System (GPS), Galileo, Glonass, Compass, Quasi-Zenith Satellite System (QZSS) over Japan, Indian Regional Navigational Satellite System (IRNSS) over India, Beidou over China, and/or the like. Moreover, the GNSS receiver 880 can be used by various augmentation systems (e.g., a Satellite Based Augmentation System (SBAS)) that may be associated with or otherwise enabled for use with one or more global and/or regional navigation satellite systems. By way of example, but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein, a GNSS may include any combination of one or more global and/or regional navigation satellite systems and/or augmentation systems, and GNSS signals may include GNSS, GNSS-like, and/or other signals associated with such one or more GNSS.

The UE 105 may further include and/or be in communication with a memory 760. The memory 760 can include, without limitation, local and/or network accessible storage, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including, without limitation, various file systems, database structures, and/or the like.

The memory 760 of the UE 105 also can comprise software elements (not shown in FIG. 7), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions executable by the UE 105 (and/or processing unit(s) 710 or DSP 720 within UE 105). In an aspect, then, such code and/or instructions can be used to configure and/or adapt a general purpose computer (or other device) to perform one or more operations in accordance with the described methods.

Figure 8:
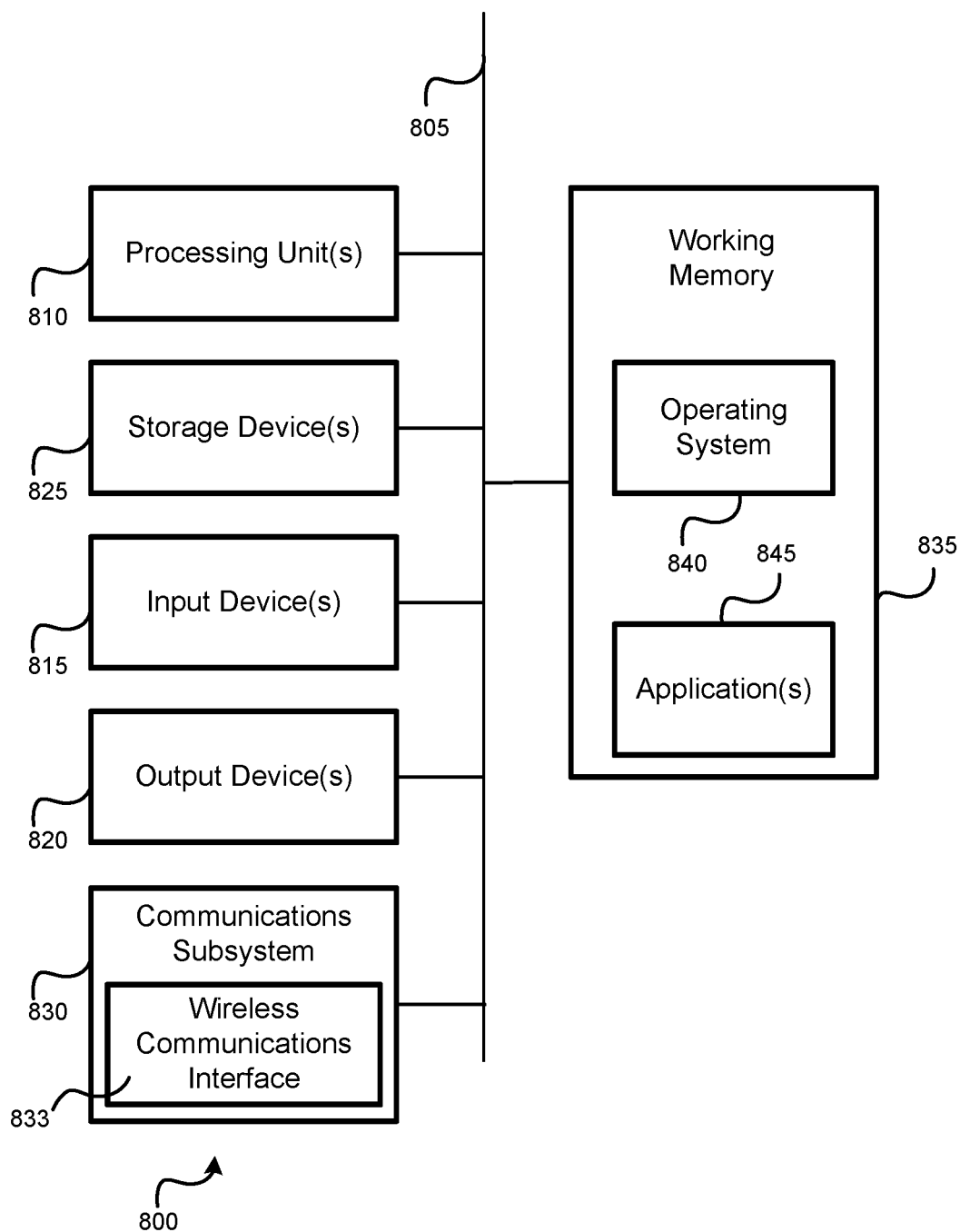
FIG. 8 is an embodiment of a computer system.

FIG. 8 illustrates an embodiment of a computer system 800, which may be utilized and/or incorporated into one or more components of a communication system (e.g., communication system 100 of FIG. 1), including various components a 5G network, including the 5G RAN and 5GC, and/or similar components of other network types. FIG. 8 provides a schematic illustration of one embodiment of a computer system 800 that can perform the methods provided by various other embodiments, such as the receiver system described in relation to FIG. 5 and the method described in relation to FIG. 6. It should be noted that FIG. 8 is meant only to provide a generalized illustration of various components, any or all of which may be utilized as appropriate. FIG. 8, therefore, broadly illustrates how individual system elements may be implemented in a relatively separated or relatively more integrated manner. In addition, it can be noted that components illustrated by FIG. 8 can be localized to a single device and/or distributed among various networked devices, which may be disposed at different physical or geographical locations. In some embodiments, the computer system 800 may correspond to an LMF 120, a gNB 110 (e.g. gNB 110-1), an eNB, an E-SMLC, a SUPL SLP and/or some other type of location-capable device.

The computer system 800 is shown comprising hardware elements that can be electrically coupled via a bus 805 (or may otherwise be in communication, as appropriate). The hardware elements may include processing unit(s) 810, which can include, without limitation, one or more general-purpose processors, one or more special-purpose processors (such as digital signal processing chips, graphics acceleration processors, and/or the like), and/or other processing structure, which can be configured to perform one or more of the methods described herein, including the receiver system described in relation to FIG. 5 and the method described in relation to FIG. 6. The computer system 800 also can include one or more input devices 815, which can include, without limitation, a mouse, a keyboard, a camera, a microphone, and/or the like; and one or more output devices 820, which can include, without limitation, a display device, a printer, and/or the like.

The computer system 800 may further include (and/or be in communication with) one or more non-transitory storage devices 825, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including, without limitation, various file systems, database structures, and/or the like.

The computer system 800 may also include a communications subsystem 830, which can include support of wireline communication technologies and/or wireless communication technologies (in some embodiments) managed and controlled by a wireless communication interface 833. The communications subsystem 830 may include a modem, a network card (wireless or wired), an infrared communication device, a wireless communication device, and/or a chipset, and/or the like. The communications subsystem 830 may include one or more input and/or output communication interfaces, such as the wireless communication interface 833, to permit data to be exchanged with a network, mobile devices, other computer systems, and/or any other electronic devices described herein. Note that the terms "mobile device" and "UE" are used interchangeably herein to refer to any mobile communications device such as, but not limited to, mobile phones, smartphones, wearable devices, mobile computing devices (e.g., laptops, PDAs, tablets), embedded modems, and automotive and other vehicular computing devices.

In many embodiments, the computer system 800 will further comprise a working memory 835, which can include a RAM and/or or ROM device. Software elements, shown as being located within the working memory 835, can include an operating system 840, device drivers, executable libraries, and/or other code, such as application(s) 845, which may comprise computer programs provided by various embodiments, and/or may be designed to implement methods, and/or configure systems, provided by other embodiments, as described herein. Merely by way of example, one or more blocks described with respect to FIG. 5 and one or more procedures described with respect to the method(s) discussed above, such as the method described in relation to FIG. 6, may be implemented as code and/or instructions executable by a computer (and/or a processing unit within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 825 described above. In some cases, the storage medium might be incorporated within a computer system, such as computer system 800. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 800 and/or might take the form of source and/or installable code, which, upon compilation and/or installation on the computer system 800 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media. Common forms of computer-readable media include, for example, magnetic and/or optical media, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification, discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

The invention claimed is:

1. A method for wireless communication comprising:
transmitting, from an antenna of a base station, a first radio beam, wherein:
  (i) the first radio beam comprises a first directional beam that propagates along a first angle of departure with respect to the antenna, and
  (ii) the first radio beam is associated with an identifier; and
sending, to a receiving device, information indicative of the first angle of departure of the first radio beam and a beam width of the first radio beam.

2. The method of claim 1, wherein the receiving device comprises a mobile device or a location server.

3. The method of claim 2, wherein sending the information indicative of the first angle of departure of the first radio beam and the beam width of the first radio beam to the mobile device comprises broadcasting the information.

4. The method of claim 1, wherein information indicative of the identifier is encoded in the first radio beam.

5. The method of claim 1, further comprising sending, to the receiving device, information indicative of a location of the antenna, a transmission pattern of the antenna, a timing related to transmitting the first radio beam, configuration information related to transmitting the first radio beam, or any combination thereof.

6. The method of claim 1, further comprising transmitting a plurality of radio beams, wherein the plurality of radio beams comprises the first radio beam, and wherein each radio beam of the plurality of radio beams has a different respective angle of departure and different respective transmission timing.

7. The method of claim 1, wherein transmitting the first radio beam comprises transmitting a synchronization signal.

8. The method of claim 7, wherein the synchronization signal includes a PSS (primary synchronization signal), a SSS (secondary synchronization signal), a TRS (Tracking Reference Signal), or any combination thereof.

9. The method of claim 1, further comprising sending, to the receiving device, information about a timing offset related to transmitting the first radio beam.

10. The method of claim 1, wherein the identifier comprises a beam identifier or a cell identifier.

11. A base station for wireless communication comprising:
an antenna;
a memory; and
one or more processors communicatively coupled with the antenna and the memory, wherein the one or more processors are configured to:
  transmit, with the antenna, a first radio beam, wherein:
    the first radio beam comprises a first directional beam that propagates along a first angle of departure with respect to the antenna, and
    the first radio beam is associated with an identifier; and
  send, to a receiving device, information indicative of the first angle of departure of the first radio beam and a beam width of the first radio beam.

12. The base station of claim 11, wherein, to send the information indicative of the first angle of departure of the first radio beam and the beam width of the first radio beam to the receiving device, the one or more processors are configured to send the information to a mobile device or a location server.

13. The base station of claim 12, wherein, to send the information indicative of the first angle of departure of the first radio beam and the beam width of the first radio beam to the mobile device, the one or more processors are configured to broadcast the information with the antenna.

14. The base station of claim 11, wherein the one or more processors are further configured to encode information indicative of the identifier in the first radio beam.

15. The base station of claim 11, wherein the one or more processors are further configured to send, to the receiving device, information indicative of a location of the antenna, a transmission pattern of the antenna, a timing related to transmitting the first radio beam, configuration information related to transmitting the first radio beam, or any combination thereof.

16. The base station of claim 11, wherein the one or more processors are further configured to transmit a plurality of radio beams with the antenna, wherein the plurality of radio beams comprises the first radio beam, and wherein each radio beam of the plurality of radio beams has a different respective angle of departure and different respective transmission timing.

17. The base station of claim 11, wherein, to transmit the first radio beam, the one or more processors are configured to transmit a synchronization signal.

18. The base station of claim 11, wherein the one or more processors are further configured to send, to the receiving device, information about a timing offset related to transmitting the first radio beam.

19. An apparatus for wireless communication comprising:
means for transmitting a first radio beam, wherein:
the first radio beam comprises a first directional beam that propagates along a first angle of departure with respect to the means for transmitting the first radio beam, and
the first radio beam is associated with an identifier; and
means for sending, to a receiving device, information indicative of the first angle of departure of the first radio beam and a beam width of the first radio beam.

20. A non-transitory computer-readable medium storing instructions for wireless communication comprising code for:
transmitting, from an antenna of a base station, a first radio beam, wherein:
the first radio beam comprises a first directional beam that propagates along a first angle of departure with respect to the antenna, and
the first radio beam is associated with an identifier; and
sending, to a receiving device, information indicative of the first angle of departure of the first radio beam and a beam width of the first radio beam.

* * * * *